United States Patent
Tada

(10) Patent No.: US 11,165,952 B2
(45) Date of Patent: Nov. 2, 2021

(54) INFORMATION PROCESSING APPARATUS, IMAGE CAPTURING APPARATUS, METHOD FOR CONTROLLING INFORMATION PROCESSING APPARATUS, AND NON-TRANSITORY STORAGE MEDIUM

(71) Applicant: CANON KABUSHIKI KAISHA, Tokyo (JP)

(72) Inventor: Junji Tada, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/691,999

(22) Filed: Nov. 22, 2019

(65) Prior Publication Data

US 2020/0177801 A1    Jun. 4, 2020

(30) Foreign Application Priority Data

Nov. 29, 2018    (JP) .............................. JP2018-224125

(51) Int. Cl.
*H04N 5/232* (2006.01)
*G06K 9/62* (2006.01)
(Continued)

(52) U.S. Cl.
CPC ....... *H04N 5/23222* (2013.01); *G06K 9/6256* (2013.01); *G06K 9/6262* (2013.01); *G06N 3/08* (2013.01); *G06N 3/04* (2013.01)

(58) Field of Classification Search
CPC ........... H04N 5/23222; H04N 5/23203; H04N 5/23299; H04N 5/23296; H04N 5/23218;
(Continued)

(56) References Cited

U.S. PATENT DOCUMENTS

2014/0344203 A1* 11/2014 Ahn ....................... G06N 3/084
706/25
2016/0139977 A1* 5/2016 Ashani ................ G06F 11/0751
714/26
(Continued)

FOREIGN PATENT DOCUMENTS

CN    1460227 A    12/2003
CN    1533551 A    9/2004
(Continued)

*Primary Examiner* — Michael S Osinski
(74) *Attorney, Agent, or Firm* — Canon U.S.A., Inc., IP Division

(57) ABSTRACT

An information processing apparatus includes a control circuit configured to set or transmit a first learning parameter to a determining device that performs processing based on a learning parameter. The control circuit sets or transmits a second learning parameter instead of the first learning parameter to the determining device in a case where a result of a determination made by the determining device satisfies a predetermined condition. The first learning parameter is a learning parameter that is obtained by performing machine learning using a first learning data group. The second learning parameter is a learning parameter that is obtained by performing machine learning using a second learning data group. The first learning data group encompasses the second learning data group and includes learning data that is not included in the second learning data group.

20 Claims, 12 Drawing Sheets

(51) Int. Cl.
*G06N 3/08* (2006.01)
*G06N 3/04* (2006.01)

(58) Field of Classification Search
CPC ............. H04N 5/23245; H04N 5/2251; H04N 5/23206; H04N 5/23241; H04N 5/23219; H04N 5/23264; H04N 5/23212; H04N 5/2254; G06K 9/6256; G06K 9/6262; G06K 9/00718; G06K 9/209; G06K 9/20; G06K 9/00771; G06N 3/04–084
See application file for complete search history.

(56) References Cited

U.S. PATENT DOCUMENTS

| | | | | |
|---|---|---|---|---|
| 2016/0335545 | A1* | 11/2016 | Qiu | H04L 67/1044 |
| 2016/0350597 | A1* | 12/2016 | Bataller | G06K 9/00718 |
| 2018/0157937 | A1* | 6/2018 | Kang | G06K 9/66 |
| 2018/0181797 | A1* | 6/2018 | Han | G06K 9/00228 |
| 2018/0197106 | A1* | 7/2018 | Fujitani | G06N 20/00 |
| 2018/0205877 | A1* | 7/2018 | Yano | G06N 3/0472 |
| 2018/0225125 | A1* | 8/2018 | Okamoto | G06K 9/00664 |
| 2018/0260711 | A1* | 9/2018 | Zhang | G06N 3/0481 |
| 2018/0349709 | A1* | 12/2018 | Shinohara | H04N 5/23203 |
| 2019/0122106 | A1* | 4/2019 | Lee | G06F 7/483 |
| 2019/0129764 | A1* | 5/2019 | Johnson | G06N 20/00 |
| 2019/0188567 | A1* | 6/2019 | Yao | G06N 3/08 |
| 2019/0286944 | A1* | 9/2019 | Thorpe | G06K 9/6257 |
| 2020/0097824 | A1* | 3/2020 | Zhang | G06N 3/10 |
| 2020/0111025 | A1* | 4/2020 | Han | G06N 20/00 |
| 2020/0132011 | A1* | 4/2020 | Kitagawa | F02D 41/2461 |
| 2020/0234136 | A1* | 7/2020 | Kitagawa | G06N 3/02 |
| 2020/0293576 | A1* | 9/2020 | Erman | G06F 3/0486 |
| 2020/0293797 | A1* | 9/2020 | Liu | G06K 9/00664 |
| 2020/0401950 | A1* | 12/2020 | Han | G06K 9/6217 |

FOREIGN PATENT DOCUMENTS

| | | |
|---|---|---|
| CN | 101097564 A | 1/2008 |
| CN | 101536020 A | 9/2009 |
| CN | 108171329 A | 6/2018 |
| JP | 11-007435 A | 1/1999 |
| JP | 2016-536868 A | 11/2016 |
| JP | 2017-055913 A | 3/2017 |
| WO | 2010/050334 A1 | 5/2010 |
| WO | 2017/159620 A1 | 9/2017 |

\* cited by examiner

INFORMATION PROCESSING APPARATUS, IMAGE CAPTURING APPARATUS, METHOD FOR CONTROLLING INFORMATION PROCESSING APPARATUS, AND NON-TRANSITORY STORAGE MEDIUM

BACKGROUND

Field

The present disclosure relates to a technique for preventing learning bias in machine learning.

Description of the Related Art

In typical still or moving image capturing using an image capturing apparatus such as a camera, a user decides on a subject through a viewfinder or the like, checks an image capturing situation to adjust framing of an image to be captured, and operates a shutter button to capture an image.

In contrast to such an image capturing apparatus that performs image capturing in accordance with a user operation, PCT Japanese Translation Patent Publication No. 2016-536868 discloses a life log camera that regularly and continuously performs image capturing without receiving an image capturing instruction from a user. A life log camera is used in a state of being attached to the body of a user with a strap or the like and records, at regular time intervals, images of scenes that the user sees in his/her daily life. Image capturing by the life log camera is performed not at intended timing, such as the timing at which a user presses a shutter button, but at regular intervals. Thus, unexpected moments that the user does not normally record can be recorded as an image.

However, in a case where automatic image capturing is regularly performed with the life log camera being put on the body of the user, an image not liked by the user may be obtained, and it may not be possible to obtain an image of a moment that the user really wants.

There is a method, using machine learning, for causing an image capturing apparatus to learn the preferences of a user. In this method, however, the learning accuracy depends on the learning data that is used. It is not easy for the user to prepare only highly accurate learning data after the image capturing apparatus goes into the user's hands, and incorrect learning or biased learning may be result.

Other than the life log camera, there is an image capturing system that is caused to learn using machine learning. In a factory, for example, an inspection system is used that learns scratches and stains on surfaces of products, captures images of products that are transported, and determines whether the products are defective.

Also in such an inspection system, if learning data is biased to data that is generated under a specific situation, biased learning occurs, and the user may be unable to obtain a desired inspection result.

SUMMARY

An embodiment of the present disclosure provides an information processing apparatus that prevents learning bias in machine learning.

An information processing apparatus according to an embodiment of the present disclosure includes a control circuit configured to set or transmit a first learning parameter to a determining device that performs processing based on a learning parameter. The control circuit sets or transmits a second learning parameter instead of the first learning parameter to the determining device in a case where a result of a determination made by the determining device satisfies a predetermined condition. The first learning parameter is a learning parameter that is obtained by performing machine learning using a first learning data group. The second learning parameter is a learning parameter that is obtained by performing machine learning using a second learning data group. The first learning data group encompasses the second learning data group and includes learning data that is not included in the second learning data group.

Further features of the present disclosure will become apparent from the following description of exemplary embodiments with reference to the attached drawings.

DESCRIPTION OF THE EMBODIMENTS

Embodiment

Configuration of Image Capturing Apparatus

Figure 1A:
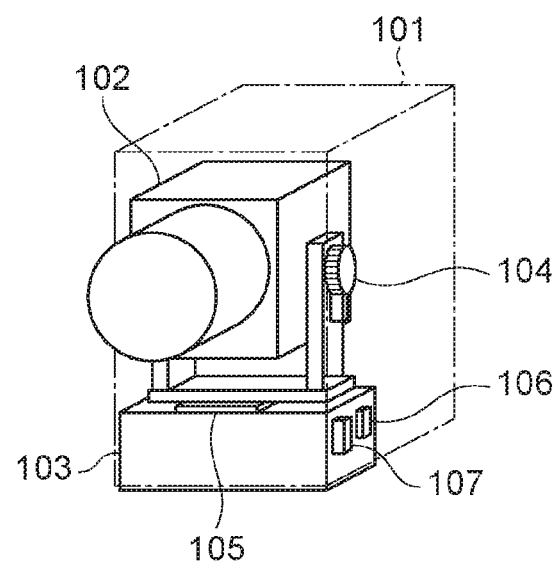
FIGS. 1A and 1B are diagrams schematically illustrating an image capturing apparatus.

FIG. 1A is a diagram schematically illustrating an image capturing apparatus according to an embodiment. An embodiment of the present disclosure is applicable not only to image capturing using a digital camera or digital video camera but also to an image capturing apparatus such as a monitoring camera, a Web camera, or a mobile phone. In the present embodiment, a description will be given under the assumption that the image capturing apparatus also functions as an information processing apparatus that performs machine learning. Alternatively, an information processing apparatus that is separated from the image capturing apparatus and capable of communicating with the image capturing apparatus may perform machine learning for the image capturing apparatus.

Figure 1B:
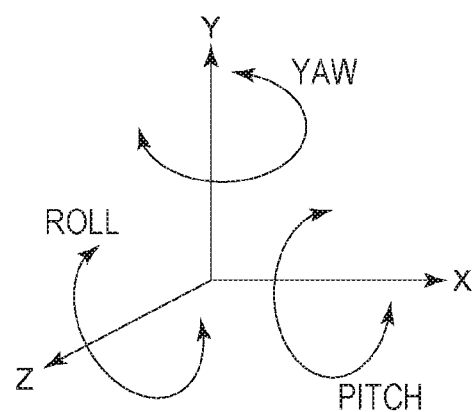

An image capturing apparatus 101 illustrated in FIG. 1A is provided with an operation member or the like with which a power switch can be operated (hereinafter the operation member is referred to as a power button, which may be operated by a tap, flick, or swipe on a touch screen). A barrel 102, which is a housing accommodating an image capturing lens group and an image capturing device that perform image capturing, is attached to the image capturing apparatus 101 and is provided with a rotation mechanism capable of driving and rotating the barrel 102 with respect to a fixed portion 103. A tilt rotation mechanism 104 is a motor drive mechanism capable of rotating the barrel 102 in a pitch direction illustrated in FIG. 1B, and a pan rotation mechanism 105 is a motor drive mechanism capable of rotating the barrel 102 in a yaw direction illustrated in FIG. 1B. Thus, the barrel 102 can be rotated in one or more axial directions. FIG. 1B illustrates the definition of axes at the position of the fixed portion 103. An angular velocity meter 106 and an acceleration meter 107 are both attached to the fixed portion 103 of the image capturing apparatus 101. With use of the angular velocity meter 106 and the acceleration meter 107, a shake of the image capturing apparatus 101 is detected, and the tilt rotation mechanism 104 and the pan rotation mechanism 105 are driven and rotated based on a detected shake angle. Accordingly, a shake or inclination of the barrel 102, which is a movable portion, is compensated for.

Figure 2:
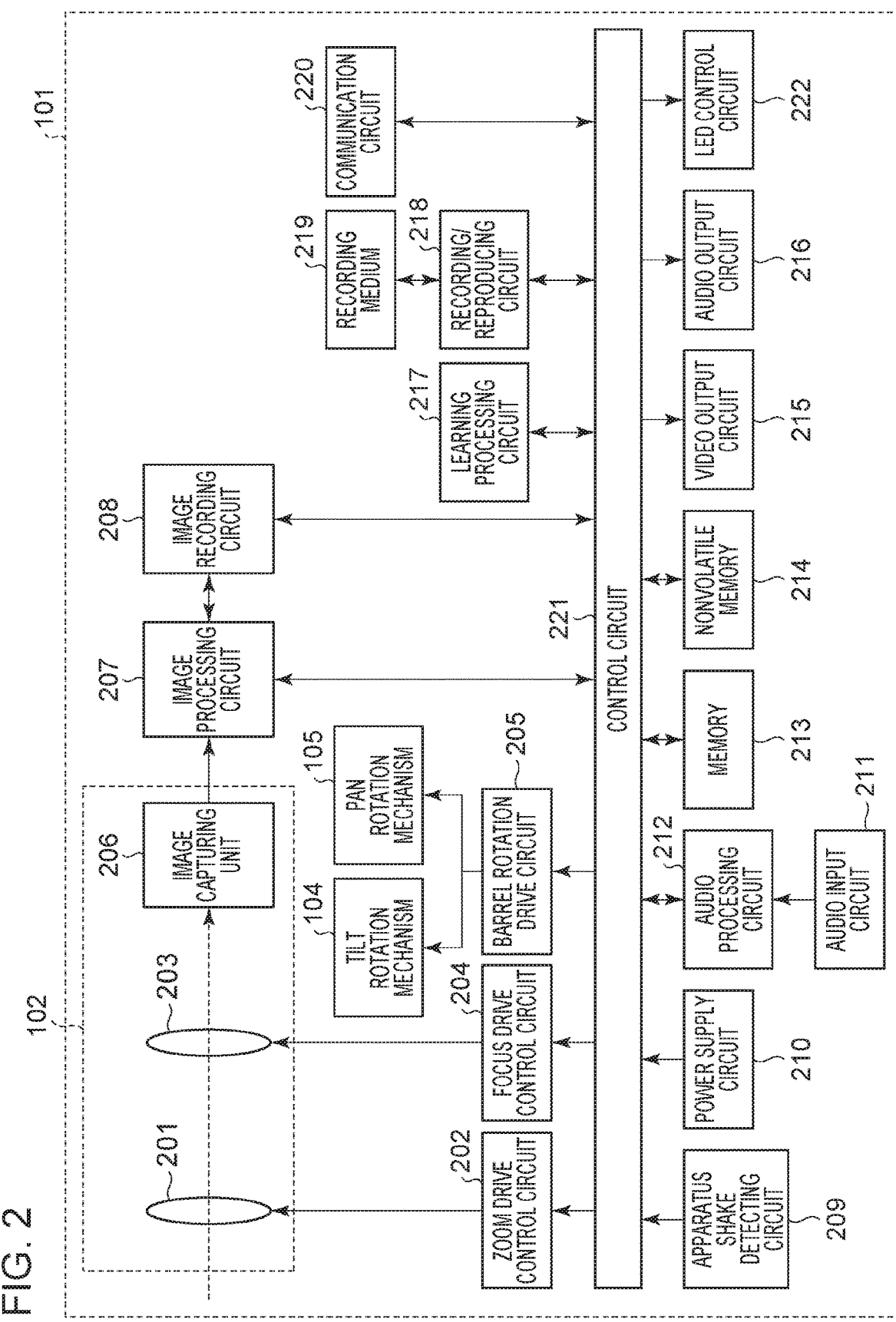
FIG. 2 is a diagram illustrating the configuration of the image capturing apparatus.

FIG. 2 is a block diagram illustrating the configuration of the image capturing apparatus 101 according to the present embodiment. In FIG. 2, a control circuit 221 is made up of a processor (for example, a central processing unit (CPU), a graphics processing unit (GPU), a microprocessor, a micro processing unit (MPU), or the like) and a memory (for example, a dynamic random access memory (DRAM), a static random access memory (SRAM), or the like). These devices execute various processing operations to control individual blocks of the image capturing apparatus 101 and control data transfer between the individual blocks. A nonvolatile memory (electrically erasable programmable read only memory (EEPROM)) 214 is an electrically erasable and recordable memory and stores constants, programs, and the like for operating the control circuit 221.

In FIG. 2, a zoom mechanism 201 includes a zoom lens that changes magnification. A zoom drive control circuit 202 drives and controls the zoom mechanism 201. A focus mechanism 203 includes a lens for adjusting focus. A focus drive control circuit 204 drives and controls the focus mechanism 203.

An image capturing unit 206 includes an image capturing device and an A/D converter. The image capturing device receives light that enters through a lens group and outputs information on electric charge corresponding to the amount of the light as analog image data to an image processing circuit 207. The image processing circuit 207 is a computing circuit equipped with a plurality of arithmetic and logic units (ALUs), applies image processing, such as distortion correction, white balance adjustment, and color interpolation, to digital image data output through A/D conversion, and outputs resulting digital image data. The digital image data output from the image processing circuit 207 is converted by an image recording circuit 208 into a recording format, such as a JPEG format, and is transmitted to a memory 213 or a video output circuit 215, which will be described below.

A barrel rotation drive circuit 205 drives the tilt rotation mechanism 104 and the pan rotation mechanism 105 to drive the barrel 102 in a tilt direction and a pan direction.

An apparatus shake detecting circuit 209 is equipped with, for example, the angular velocity meter (gyro sensor) 106 that detects angular velocities along three axial directions of the image capturing apparatus 101 and the acceleration meter (acceleration sensor) 107 that detects accelerations along three axial directions of the image capturing apparatus 101. The apparatus shake detecting circuit 209 computes, based on a detected signal, the rotation angle of the apparatus or the amount of shift of the apparatus.

An audio input circuit 211 obtains an audio signal around the image capturing apparatus 101 from a microphone provided on the image capturing apparatus 101, performs A/D conversion on the audio signal, and transmits the converted audio signal to an audio processing circuit 212. The audio processing circuit 212 performs audio processing, such as optimization processing, on the digital audio signal input thereto. The audio signal processed by the audio processing circuit 212 is transmitted to the memory 213 by the control circuit 221. The memory 213 temporarily stores the image signal and the audio signal obtained by the image processing circuit 207 and the audio processing circuit 212, respectively.

The image processing circuit 207 and the audio processing circuit 212 read out the image signal and the audio signal temporarily stored in the memory 213 and encode the image signal and the audio signal to generate a compressed image signal and a compressed audio signal, respectively. The control circuit 221 transmits the compressed image signal and the compressed audio signal to a recording/reproducing circuit 218.

The recording/reproducing circuit 218 records, on a recording medium 219, the compressed image signal and the compressed audio signal generated by the image processing circuit 207 and the audio processing circuit 212, respectively, and control data or the like related to image capturing. In a case where compression coding is not performed on the audio signal, the control circuit 221 transmits the audio signal generated by the audio processing circuit 212 and the compressed image signal generated by the image processing circuit 207 to the recording/reproducing circuit 218 and causes the recording/reproducing circuit 218 to record the audio signal and the compressed image signal on the recording medium 219.

The recording medium 219 may be a recording medium built in the image capturing apparatus 101 or may be a detachable recording medium. Various data including a compressed image signal, a compressed audio signal, and an audio signal that have been generated by the image capturing apparatus 101 can be recorded on the recording medium 219. Typically, a medium whose capacity is larger than that of the nonvolatile memory 214 is used as the recording medium 219. The recording medium 219 may be any type of recording medium, for example, a hard disk, an optical disc, a magneto-optical disc, a compact disc recordable (CD-R), a digital versatile disc recordable (DVD-R), magnetic tape, a nonvolatile semiconductor memory, or a flash memory.

The recording/reproducing circuit 218 reads out (reproduces) a compressed image signal, a compressed audio signal, an audio signal, various data, and a program recorded on the recording medium 219. The control circuit 221 transmits the compressed image signal and the compressed audio signal that have been read out to the image processing circuit 207 and the audio processing circuit 212, respectively. The image processing circuit 207 and the audio processing circuit 212 cause the memory 213 to temporarily store the compressed image signal and the compressed audio signal, respectively, decode the compressed image signal and the compressed audio signal in a predetermined procedure, respectively, and transmit the decoded image signal and the decoded audio signal to the video output circuit 215 and an audio output circuit 216, respectively.

The audio input circuit 211 obtains audio signals from a plurality of microphones provided on the image capturing apparatus 101. The audio processing circuit 212 is capable of detecting the direction of sound on a plane where the plurality of microphones are placed and is used for search or automatic image capturing, which will be described below. Furthermore, the audio processing circuit 212 detects a specific audio command. The audio command may be a plurality of commands registered in advance. A user may be allowed to register a specific sound in the image capturing apparatus 101. In addition, audio scene recognition is performed. In audio scene recognition, audio scene determination is performed by a network that has performed machine learning in advance based on a large amount of audio data. For example, a network for detecting specific scenes, such as "there is applause", "there is clapping of hands", and "voice is produced" is set to the audio processing circuit 212. When detecting a specific audio scene or a specific audio command, the audio processing circuit 212 outputs a detection trigger signal to the control circuit 221. A power supply circuit 210 supplies power for operating the control circuit 221.

The audio output circuit 216 outputs, at the time of image capturing, for example, an audio pattern set in advance from a speaker built in the image capturing apparatus 101. A light emitting diode (LED) control circuit 222 controls, at the time of image capturing, for example, an LED provided on the image capturing apparatus 101 with a light-up-or-blink pattern set in advance. The video output circuit 215 is made up of, for example, a video output terminal, and transmits an image signal to a connected external display or the like to display video thereon. Alternatively, the audio output circuit 216 and the video output circuit 215 may be a combined single terminal, for example, a High-Definition Multimedia Interface (HDMI, registered trademark) terminal.

A communication circuit 220 is used to perform communication between the image capturing apparatus 101 and an external apparatus, and transmits and receives data, such as an audio signal, an image signal, a compressed audio signal, and a compressed image signal. In addition, the communication circuit 220 receives a control signal related to image capturing, such as an image capturing start/end command or a pan/tilt or zoom drive signal, and drives the image capturing apparatus 101 in response to an instruction from the external apparatus that is capable of performing mutual communication with the image capturing apparatus 101. In addition, the communication circuit 220 performs transmission and reception of information, such as various parameters related to learning processed by a learning processing circuit 217, which will be described below, between the image capturing apparatus 101 and the external apparatus. The communication circuit 220 is, for example, a wireless communication module such as an infrared communication module, a Bluetooth (registered trademark) communication module, a wireless local area network (LAN) communication module, a wireless universal serial bus (USB), or a Global Positioning System (GPS) receiver.

Configuration of Wireless Communication System

Figure 3:
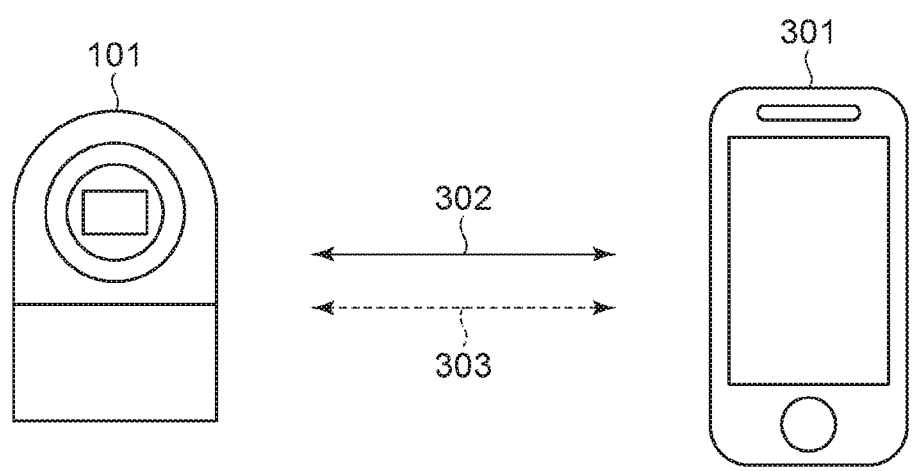
FIG. 3 is a diagram illustrating the configuration of a wireless communication system.

FIG. 3 is a diagram illustrating an example configuration of a wireless communication system including the image capturing apparatus 101 and an external apparatus 301. The image capturing apparatus 101 is a digital camera having an image capturing function, and the external apparatus 301 is a smart apparatus including a Bluetooth communication module and a wireless LAN communication module.

The image capturing apparatus 101 and the external apparatus 301 are capable of communicating with each other via a communication device 302 using a wireless LAN conforming to, for example, the IEEE 802.11 standard series, and a communication device 303 having a master and slave relationship between a control station and a slave station, such as Bluetooth Low Energy (BLE). The wireless LAN and BLE correspond to an example of a communication scheme. Another communication scheme may be used as long as the individual communication devices have two or more communication functions, and one of the communication functions that performs communication in the relationship between the control station and the slave station is capable of controlling the other communication function. Note that a first communication scheme such as wireless LAN is capable of communication faster than a second communication scheme such as BLE, and that the second communication scheme consumes lower power than the first communication scheme or has a shorter communication range than the first communication scheme, without loosing generality.

Figure 4:
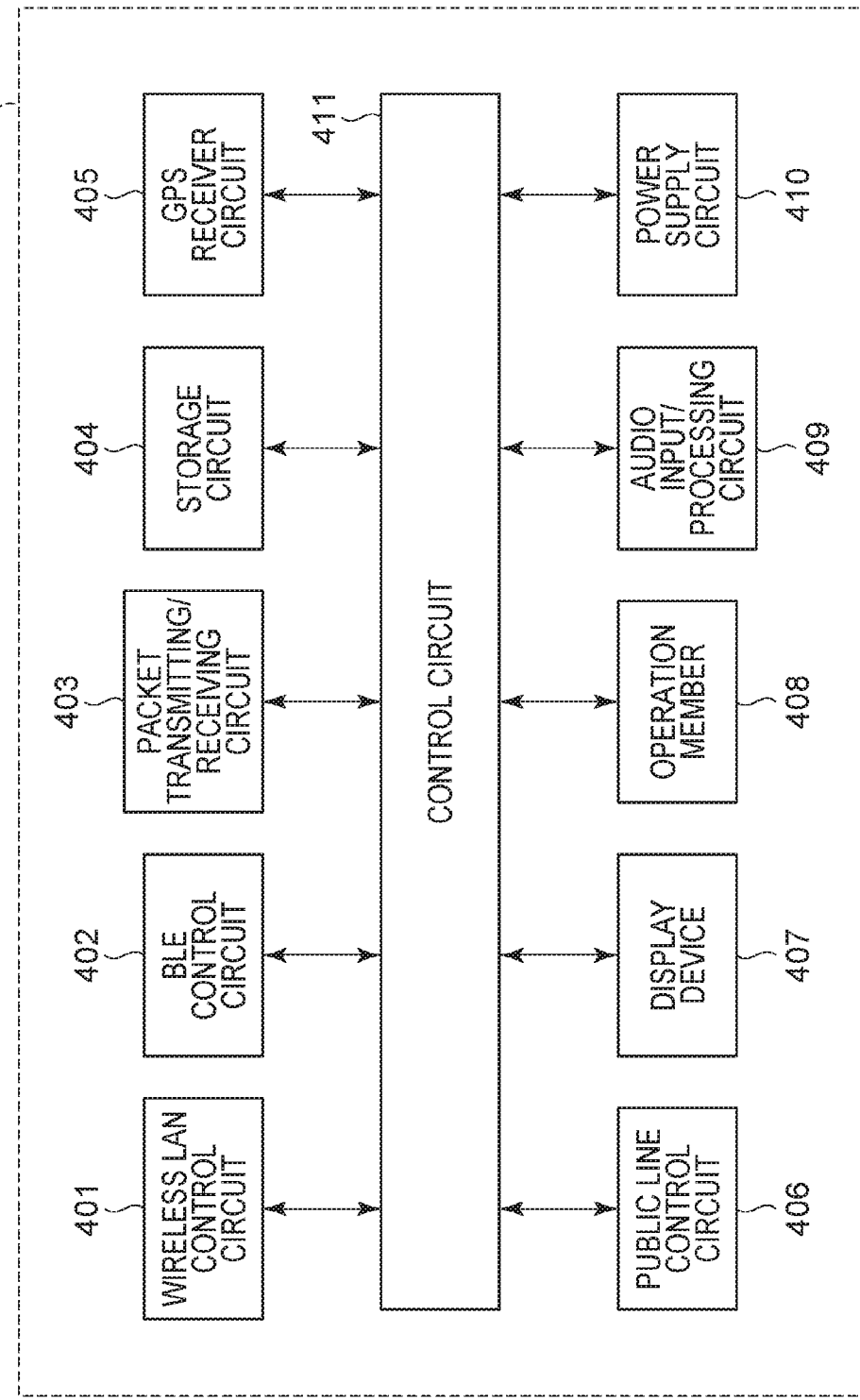
FIG. 4 is a diagram illustrating the configuration of the external apparatus.

The configuration of the external apparatus 301 will be described with reference to FIG. 4. The external apparatus 301 includes, for example, a wireless LAN control circuit 401 for a wireless LAN, a BLE control circuit 402 for BLE, and a public line control circuit 406 for public wireless communication. The external apparatus 301 further includes a packet transmitting/receiving circuit 403. The wireless LAN control circuit 401 performs radio frequency (RF) control of the wireless LAN, communication processing, and protocol processing related to a driver that performs various control operations of communication using the wireless LAN conforming to the IEEE 802.11 standard series and the communication using the wireless LAN. The BLE control circuit 402 performs RE control of BLE, communication processing, and protocol processing related to a driver that performs various control operations of communication using BLE and the communication using BLE. The public line control circuit 406 performs RE control of public wireless communication, communication processing, and protocol processing related to a driver that performs various control operations of public wireless communication and the public wireless communication. The public wireless communication conforms to, for example, the International Multimedia Telecommunications (IMT) standard, the Long Term Evolution (LTE) standard, or the like. The packet transmitting/receiving circuit 403 performs processing for executing at least either transmission or reception of packets related to communication using the wireless LAN and BLE and public wireless communication. In this example, a description will be given under the assumption that the external apparatus 301 performs at least either transmission or reception of packets during communication. Alternatively, another communication scheme, such as circuit switching, may be used instead of packet exchange.

The external apparatus 301 further includes, for example, a control circuit 411, a storage circuit 404, a GPS receiver circuit 405, a display device 407, an operation member 408, an audio input/processing circuit 409, and a power supply circuit 410. The control circuit 411 executes, for example, a control program stored in the storage circuit 404 to control the entire external apparatus 301. The storage circuit 404 stores, for example, the control program executed by the control circuit 411 and various pieces of information, such as parameters used for communication. Various operations described below are performed when the control circuit 411 executes the control program stored in the storage circuit 404.

The power supply circuit 410 supplies power to the external apparatus 301. The display device 407 has, for example, a function of outputting visually-recognizable information, such as a liquid crystal display (LCD) or a light emitting diode (LED), or a function of outputting sound, such as a speaker, and displays various pieces of information. The operation member 408 is a button or the like that receives a user operation performed on the external apparatus 301. The display device 407 and the operation member 408 may be formed of a common member, such as a touch screen.

The audio input/processing circuit 409 may be configured to obtain a voice produced by a user from, for example, a general-purpose microphone built in the external apparatus 301, and to obtain an operation instruction from the user by voice recognition processing.

In addition, the audio input/processing circuit 409 obtains an audio command from a voice produced by the user via, a dedicated application in the external apparatus 301. The audio command may be registered as a specific audio command for causing the audio processing circuit 212 of the image capturing apparatus 101 to recognize the specific audio command via the communication device 302 using the wireless LAN.

The GPS receiver circuit 405 receives a GPS signal transmitted front a satellite, analyzes the GPS signal, and estimates the current position (longitude and latitude information) of the external apparatus 301. Alternatively, the current position of the external apparatus 301 may be estimated based on information on a wireless network existing in the surroundings by using a Wi-Fi Positioning System (WPS) or the like. In a case where the position indicated by the obtained current GPS position information is within a position range set in advance (within a range of a predetermined radius) or in a case where the GPS position information has changed by a predetermined amount or more, the GPS receiver circuit 405 transmits movement information to the image capturing apparatus 101 via the BLE control circuit 402, and the movement information is used as a parameter for automatic image capturing or automating editing, which will be described below.

As described above, the external apparatus 301 transmits/receives data to/from the image capturing apparatus 101 through communication using the wireless LAN control circuit 401 and the BLE control circuit 402. For example, data such as an audio signal, an image signal, a compressed audio signal, and a compressed image signal is transmitted/received. In addition, the external apparatus 301 transmits an operation instruction for image capturing by the image capturing apparatus 101, transmits audio command registration data, and transmits a predetermined position detection notification or movement notification based on GPS position information. Also, the external apparatus 301 transmits/receives learning data via a dedicated application in the external apparatus 301.

Sequence of Image Capturing Operation

Figure 5:
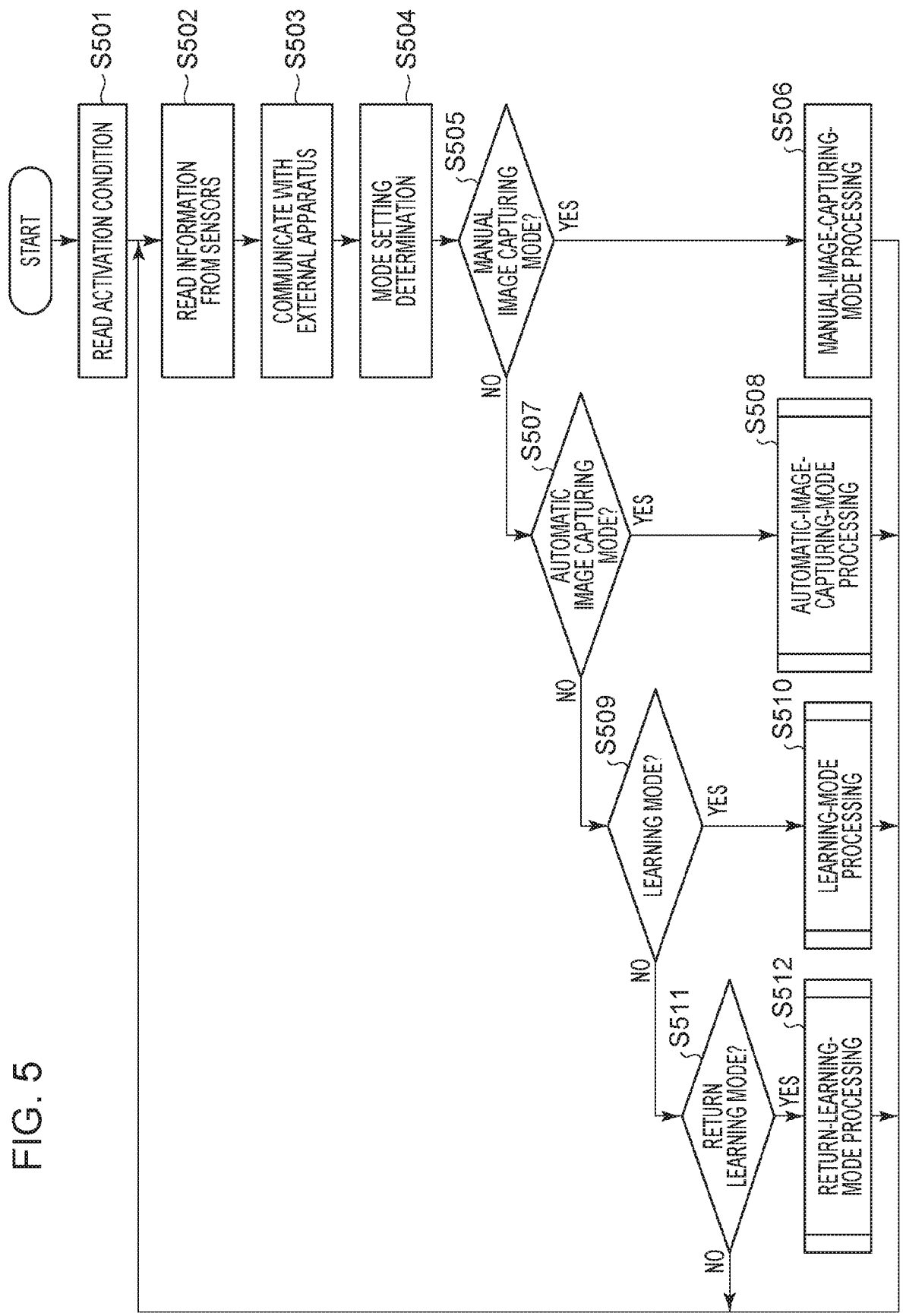
FIG. 5 is a flowchart for describing an operation of a control circuit.

FIG. 5 is a flowchart for describing an example of an operation performed by the control circuit 221 of the image capturing apparatus 101 according to the present embodiment.

Upon the power button of the image capturing apparatus 101 being operated by a user, the power supply circuit 210 supplies power to the control circuit 221 and the individual blocks of the image capturing apparatus 101. The operation illustrated in FIG. 5 starts upon the power being supplied in step S501 (hereinafter "step S" will be simply referred to as "S"), an activation condition is read. In the present embodiment, power-on may be performed in response to manual pressing of the power button, or in response to an instruction from an external apparatus (for example, the external apparatus 301) through external communication (for example, BLE communication). Alternatively, power-on may be performed in response to detection of tapping on the image capturing apparatus 101 by the user, or in response to detection of input of a specific audio command. The activation condition read here is used as one parameter element of subject search or automatic image capturing, which will be described below. After the activation condition is read, the operation proceeds to S502.

In S502, information is read from various sensors. The information read here includes information detected by sensors that detect a shake, such as the gyro sensor and acceleration sensor equipped in the apparatus shake detecting circuit 209. The information read here also includes the rotation positions of the tilt rotation mechanism 104 and the pan rotation mechanism 105. The information read here also includes an audio level, a detection trigger of specific audio recognition, and a sound direction detected by the audio processing circuit 212.

Although not illustrated in FIGS. 1 to 4, a sensor that detects environment information obtains information. Examples of the sensor include a temperature sensor that detects an ambient temperature of the image capturing apparatus 101 at a predetermined interval, and an atmospheric pressure sensor that detects a change in ambient atmospheric pressure of the image capturing apparatus 101. Examples of the sensor also include an illuminance sensor that detects an ambient illuminance of the image capturing apparatus 101, a humidity sensor that detects an ambient humidity of the image capturing apparatus 101, and an ultraviolet (UV) sensor that detects the amount of ultraviolet around the image capturing apparatus 101. In addition to temperature information, atmospheric pressure information, illuminance information, humidity information, and UV information that have been detected, the amount of change in temperature, the amount of change in atmospheric pressure, the amount of change in illuminance, the amount of change in humidity, and the amount of change in ultraviolet that are obtained by calculating change rates at a predetermined time interval from the detected pieces of information may be used for determination of automatic image capturing or the like, which will be described below.

After the reading of information from the various sensors is finished in S502, the operation proceeds to S503. In S503, a determination is made whether there is a communication instruction provided from the external apparatus 301. In a case where there is a communication instruction, communication with the external apparatus 301 is performed. For example, a remote operation or transmission/reception of data such as an audio signal, an image signal, a compressed audio signal, or a compressed image signal is performed by the external apparatus 301 via the wireless LAN or BLE. In addition, reading is performed to determine whether there is an operation instruction for image capturing by the image capturing apparatus 101, transmission of audio command registration data, a predetermined position detection notification or movement notification based on GPS position information, or an instruction to transmit/receive learning data from the external apparatus 301.

The above-described various sensors that detect environment information may be mounted on the image capturing apparatus 101 or the external apparatus 301. In a case where the sensors are mounted on the external apparatus 301, environment information is read by using BLE. After the reading from the external apparatus 301 through communication is performed in S503, the operation proceeds to S504.

In S504, mode setting determination is performed. The mode set in S504 is determined and selected from among the following modes.

(1) Manual Image Capturing Mode

Mode Determination Condition

A manual image capturing mode is set in response to detection of a command for setting the manual image capturing mode transmitted by the external apparatus 301.

Processing in the Mode

In manual-image-capturing-mode processing (S506), pan/tilt driving or zoom driving is performed in accordance with input by a user, and a still image is captured or recording of a moving image is started in accordance with an instruction from the user.

(2) Automatic Image Capturing Mode

Mode Determination Condition

An automatic image capturing mode is set in response to a determination that automatic image capturing is to be performed, the determination being made based on pieces of detected information set by learning described below (image, sound, time, shake, place, change in body, and change in environment), an elapsed time from shift to the automatic image capturing mode, information on previous image capturing, or the like.

Processing in the Mode

In automatic-image-capturing-mode processing (S508), the learning processing circuit 217 functioning as a determining device automatically searches for a subject by performing pan/tilt driving or zoom driving, based on pieces of detected information (image, sound, time, shake, place, change in body, and change in environment). When a determination is made that the timing to capture an image liked by a user has come, image capturing is automatically performed. In a case where an image capturing instruction is provided by the user, image capturing is performed in accordance with the instruction.

(3) Learning Mode

Mode Determination Condition

A learning mode is set in response to a determination that learning is to be performed, the determination being made based on an elapsed time from the last learning processing, the number of pieces of information or learning data associated with images usable for learning, or the like. This mode is set also in response to an instruction to set a learning parameter provided from the external apparatus 301 through communication.

Processing in the Mode

In learning-mode processing (S510), the learning processing circuit 217 performs learning for meeting the preferences of a user. The learning for meeting the preferences of the user is performed by using a neural network, based on information about operations in the external apparatus 301 and notification of learning data from the external apparatus 301. The information about operations in the external apparatus 301 includes, for example, information about image acquisition from the image capturing apparatus 101, information for which a manual edit instruction is provided via a dedicated application, and information about a determination value input by the user to an image in the image capturing apparatus 101.

(4) Return Learning Mode

Mode Determination Condition

A return learning mode is set in response to a determination that the learning parameter is to be changed to a previous learning parameter, the determination being made based on a cumulative activation time from the last learning processing and the number of times automatic image capturing has been performed since the last learning processing. This mode is set also in response to an instruction to change the learning parameter to a previous learning parameter provided from the external apparatus 301 through communication.

Processing in the Mode

In return-learning-mode processing (S512), the learning parameter set to the learning processing circuit 217 functioning as a determining device is changed to the learning parameter obtained in the last learning processing. Alternatively, learning processing is performed again by using learning data except for newly obtained learning data.

The details of the automatic-image-capturing-mode processing, the learning-mode processing, and the return-learning-mode processing will be described below.

In S505 in FIG. 5, a determination is made whether the manual image capturing mode is set in the mode setting determination in S504. If a determination is made that the manual image capturing mode is set, the operation proceeds to S506, where manual-image-capturing-mode processing is performed. In the manual-image-capturing-mode processing, the image capturing apparatus 101 is driven in accordance with input by the user, as described above. After the processing ends, the operation returns to S502.

On the other hand, if a determination is made in S505 that the manual image capturing mode is not set, the operation proceeds to S507, where a determination is made whether or not the automatic image capturing mode is set. If the automatic image capturing mode is set, the operation proceeds to S508, where automatic-image-capturing-mode processing is performed. After the processing ends, the operation returns to S502. If a determination is made in S507 that the automatic image capturing mode is not set, the operation proceeds to S509.

In S509, a determination is made whether or not the learning mode is set. If the learning mode is set, the operation proceeds to S510, where learning-mode processing is performed. After the processing ends, the operation returns to S502, and the operation is repeated. If a determination is made in S509 that the learning mode is not set, the operation proceeds to S511.

In S511, a determination is made whether or not the return learning mode is set. If the return learning mode is set, the operation proceeds to S512, where return-learning-mode processing is performed. After the processing ends, the operation returns to S502, and the operation is repeated. If a determination is made in S511 that the return learning mode is not set, the operation returns to S502, and the operation is repeated.

Automatic-Image-Capturing-Mode Processing

Figure 6:
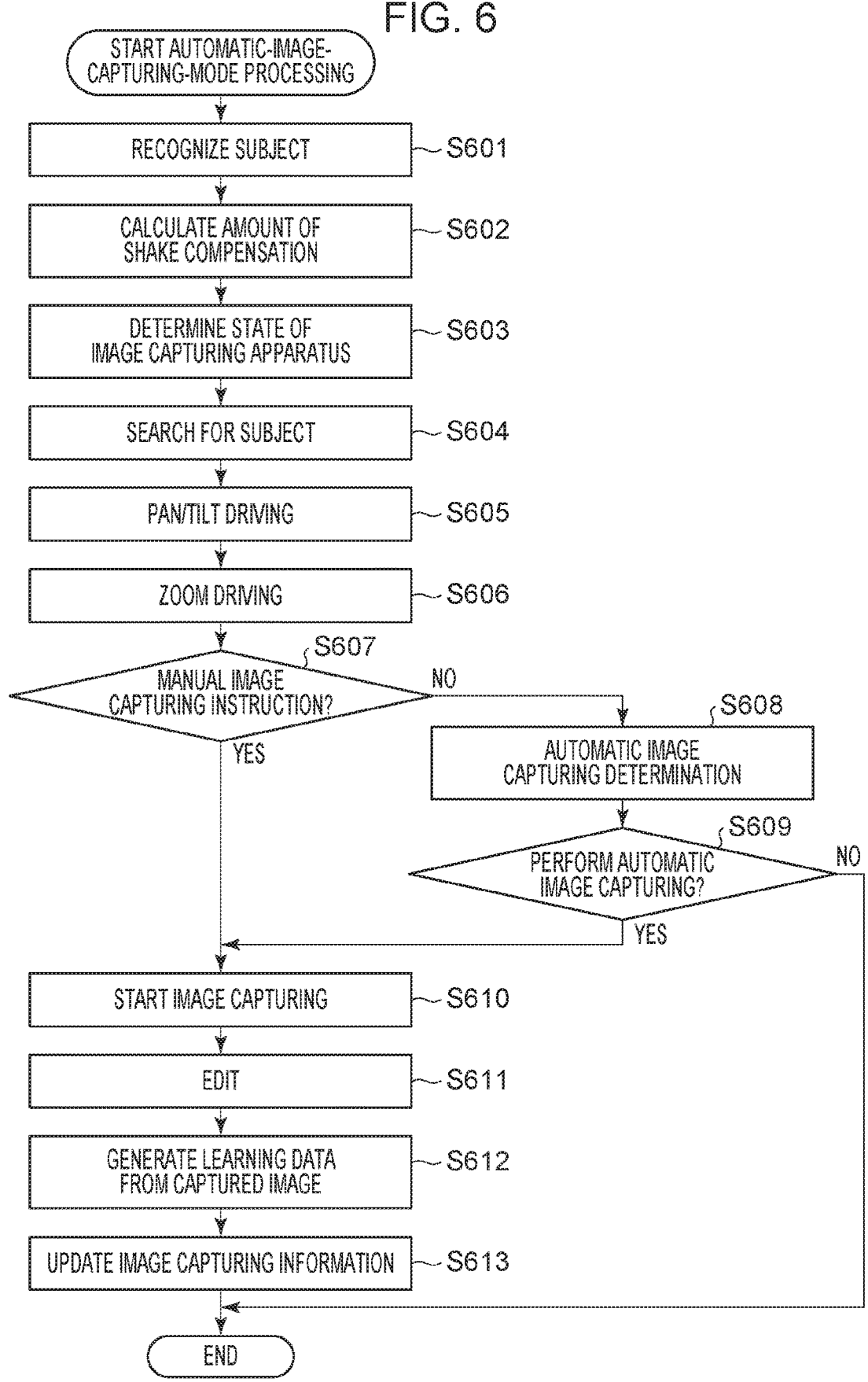
FIG. 6 is a flowchart for describing automatic-image-capturing-mode processing.

A description will be given of the details of the automatic-image-capturing-mode processing in S508 in FIG. 5 with reference to FIG. 6. As described above, the processing described below is controlled by the control circuit 221 of the image capturing apparatus 101 according to the present embodiment.

In S601, the image processing circuit 207 is caused to perform image processing on a signal captured by the image capturing unit 206 to generate an image for subject recognition. Subject recognition, such as person recognition or object recognition, is performed on the generated image.

In the case of recognizing a person, the face or body of the person is detected. In face detection, a pattern for determining the face of a person is determined in advance, and a portion of a captured image that matches the pattern can be detected as a face image of the person.

At the same time, the degree of reliability indicating how much the portion is likely to be the face of a subject is calculated. The degree of reliability is calculated based on, for example, the size of a face region in the image, the degree of match with a face pattern, or the like.

Similarly, in object recognition, an object that matches a pattern registered in advance can be recognized. There is also a method for extracting a characteristic subject by using a histogram of the hue, saturation, and the like of a captured image. In this case, a distribution derived from the histogram of the hue, saturation, and the like of the image of a subject within an angle of view is divided into a plurality of sections, and the captured image is classified in each section.

For example, a histogram of a plurality of color components is created for the captured image, the mountain-shaped distribution range is divided into sections, the captured image is classified in a region belonging to a combination of the same sections, and an image region of a subject is recognized.

As a result of calculating an evaluation value for each image region of a recognized subject, an image region of a subject having the largest evaluation value can be determined to be a main subject region.

With this method, pieces of subject information can be obtained from image capturing information.

In S602, the amount of shake compensation is calculated. Specifically, the absolute angle of the image capturing apparatus 101 is calculated based on angular velocity and acceleration information obtained by the apparatus shake detecting circuit 209. Subsequently, an image stabilization angle is calculated as the amount of shake compensation. The tilt rotation mechanism 104 and the pan rotation mechanism 105 are to be moved by the image stabilization angle in the angular direction of cancelling out the absolute angle.

In S603, the state of the image capturing apparatus 101 is determined. Based on the angle, the amount of movement, and the like detected from angular velocity information, acceleration information, GPS position information, and the like, the current shake/movement state of the image capturing apparatus 101 is determined. For example, in the case of capturing an image by attaching the image capturing apparatus 101 to a vehicle, subject information on scenes around the vehicle greatly changes in accordance with a movement distance.

Thus, a determination is made whether or not the image capturing apparatus 101 is in an "on-vehicle moving state", that is, the apparatus is mounted on a car or the like and moving fast. A result of the determination can be used for automatic subject search, which will be described below.

In addition, a determination is made whether or not there is a great change in angle, and a determination is made whether the image capturing apparatus 101 is in a "stationary state" where the image capturing apparatus 101 hardly has a shake angle. In the "stationary state", it may be assumed that the image capturing apparatus 101 hardly has a change in angle, and thus subject search for the stationary state can be performed.

In a case where there is a relatively great change in angle, a determination is made that the image capturing apparatus 101 is in a "hand-held state", and subject search for the hand-held state can be performed.

In S604, subject search is performed. The control circuit 221 divides a 360-degree area around the position of the image capturing apparatus 101 (an origin point corresponds to the position of the image capturing apparatus 101) into areas. For each of the areas, an importance level is calculated which indicates the order of priority with which search is performed in accordance with a subject existing in the area or a scene situation of the area. The importance level based on the situation of a subject is calculated based on, for example, the number of people existing in the area, the size of the face of a person, the orientation of the face, the reliability of face detection, the expression of a person, and a personal authentication result of a person. The importance level based on the situation of a scene is calculated based on, for example, a general object recognition result, a scene determination result (blue sky, backlighted, evening scene, or the like), the level of sound from the area, a voice recognition result, motion detection information in the area, and so forth. The shake state of the image capturing apparatus 101 is detected in the determination of the state of the image capturing apparatus 101 (S603), and thus the importance level may be changed in accordance with the shake state. For example, in a case where the shake state is determined to be the "stationary state", a determination is made to increase the importance level when the face of a specific person is detected so that subject search is performed mainly for a high-priority subject (for example, the user of the image capturing apparatus 101) among subjects registered in face authentication. Also, automatic image capturing, which will be described below, is performed with priority being given to the face. Thus, even if image capturing is often performed with the image capturing apparatus 101 being put on the body of the user who is walking, many images of the user can be taken by putting the image capturing apparatus 101 on a desk or the like. At this time, subject search can be performed by panning and tilting. Thus, an image of the user, a group photo of many people, and the like can be taken by just putting the image capturing apparatus 101 somewhere, without considering the angle or the like of the apparatus. As long as no change occurs in each area, the area with the highest importance level does not change under the above-described condition, and thus the area that is searched for does not change. Thus, the importance level may be changed in accordance with information about previous image capturing. Specifically, the importance level of the area that has continuously been designated as a search area for a predetermined period may be lowered, or the importance level of the area where image capturing is performed in S610, which will be described below, may be lowered for a predetermined period.

After the importance levels of the individual areas are calculated, an area with a high importance level is determined to be a search target area. Subsequently, a pan/tilt search target angle for including the search target area within the angle of view is calculated.

In S605, pan/tilt driving is performed. Specifically, the amount of image blur correction is added to a drive angle in control sampling based on the pan/tilt search target angle to calculate the amount of pan/tilt driving, and the barrel rotation drive circuit 205 performs drive control on the tilt rotation mechanism 104 and the pan rotation mechanism 105.

In S606, zoom driving is performed by controlling the zoom mechanism 201. Specifically, zoom driving is performed in accordance with the state of a subject as a search target determined in S604. For example, in a case where the subject as a search target is the face of a person, if the face on the image is too small with a size below a minimum detectable size, the face may be undetectable and missed. In such a case, control is performed to increase the size of the face on the image by performing zooming in the telephoto direction. On the other hand, in a case where the face on the image is too large, the subject is likely to be out of the angle of view depending on the movement of the subject or the image capturing apparatus 101. In such a case, control is performed to decrease the size of the face on the image by performing zooming in the wide-angle direction. The zoom control makes it possible to maintain a state suitable for tracking the subject.

A description has been given of the method for performing subject search by pan/tilt driving or zoom driving in S604 to S606. Alternatively, subject search may be performed by using an image capturing system that captures an omnidirectional image by using a plurality of wide-angle lenses. In an omnidirectional camera, an enormous amount of processing is necessary to perform image processing, such as subject detection, by using all signals obtained by image capturing as an input image. Thus, a part of the image may be extracted, and subject search may be performed within the extracted image range. The importance levels of individual areas may be calculated by using a method similar to the above-described method, the position to be extracted may be changed based on the importance levels, and a determination of automatic image capturing, which will be described below, may be performed. Accordingly, power consumption in the image processing can be reduced, and subject search can be quickly performed.

In S607, with the automatic image capturing mode being set, a determination is made whether an image capturing instruction has been provided by a user (manual image capturing instruction). In a case where an image capturing instruction has been provided, the processing proceeds to S610. At this time, the image capturing instruction from the user may be provided by pressing a shutter button, tapping the housing of the image capturing apparatus 101 with a finger or the like, inputting an audio command, or providing an instruction from an external apparatus. The tap operation for providing an image capturing instruction is an image capturing instruction method in which the apparatus shake detecting circuit 209 detects a continuous high-frequency acceleration for a short period when the user taps the housing of the image capturing apparatus 101, and the detected acceleration is used as a trigger for image capturing. The input of an audio command is an image capturing instruction method in which the audio processing circuit 212 recognizes a voice of a user when the user utters predetermined words to provide an instruction to capture an image (for example, "take a picture"), and the recognized voice is used as a trigger for image capturing. Providing an instruction from an external apparatus is an image capturing instruction method in which a shutter instruction signal transmitted via a dedicated application from a smartphone or the like connected by Bluetooth to the image capturing apparatus 101 is used as a trigger.

In a case where there is no image capturing instruction in S607, the processing proceeds to S608, where the learning processing circuit 217 performs automatic image capturing determination. In the automatic image capturing determination, a determination is made whether to perform automatic image capturing.

Figure 7:
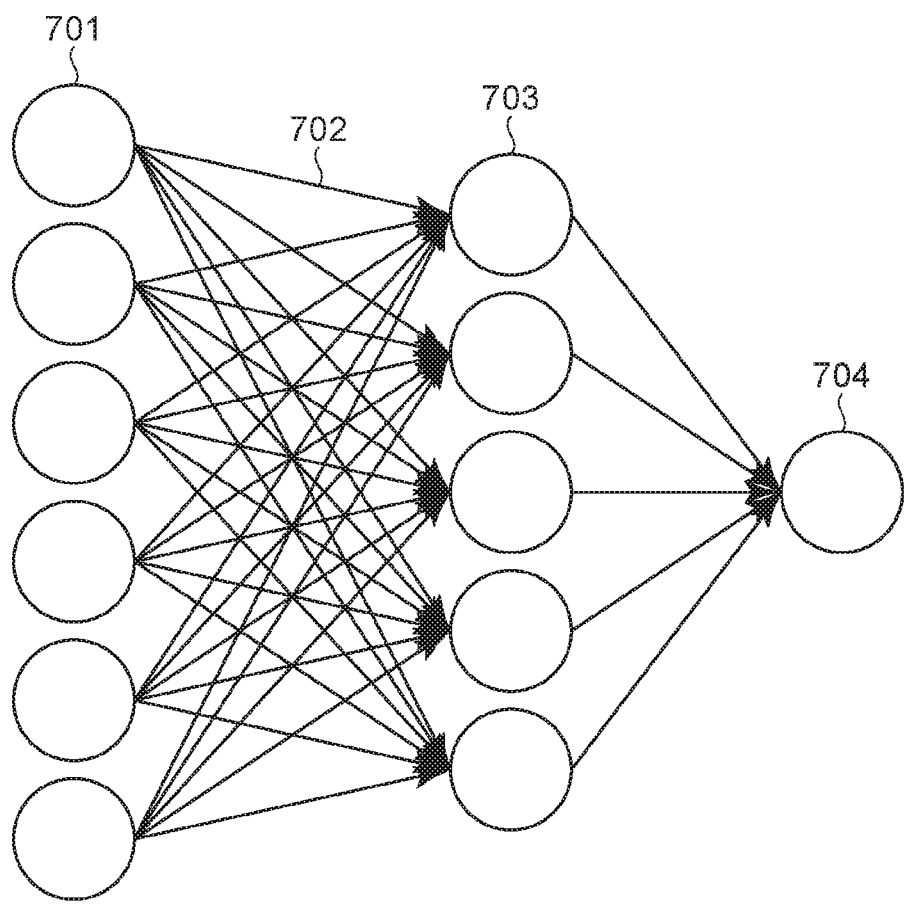
FIG. 7 is a diagram for describing a neural network.

The determination of whether to perform automatic image capturing is made based on a neural network, which is one method of machine learning. As an example of the neural network. FIG. 7 illustrates an example of a multilayer perceptron network. The neural network is used to predict an output value from an input value. Learning of an input value and a model output value for the input value in advance makes it possible to estimate an output value for a new input value in accordance with a learned model. A method for learning will be described below. In FIG. 7, vertically arranged circles the top of which is denoted by 701 are neurons in an input layer, vertically arranged circles the top of which is denoted by 703 are neurons in an intermediate layer, and a circle denoted by 704 is a neuron in an output layer. Arrows one of which is denoted by 702 indicate connections between the neurons. In a determination based on the neural network, feature values based on a subject within a current angle of view and the states of a scene and the image capturing apparatus are given as inputs to the neurons in the input layer, and a value output from the output layer is obtained through computation that is based on the forward propagation rule of a multilayer perceptron. If the output value is larger than or equal to a threshold value, a determination is made to perform automatic image capturing. As features of a subject, a current zoom magnification, a general object recognition result in a current angle of view, a face detection result, the number of faces in a current angle of view, a smile level or eye closure level of a face, a face angle, a face authentication ID number, a line-of-sight angle of a person as a subject, a scene determination result, a detection result of a specific composition, and so forth may be used. Also, an elapsed time from the last image capturing, a current time, GPS position information and the amount of change in position from the last image capturing, a current audio level, whether or not there is a person producing a voice, clapping of hands, or applause, and so forth ay be used. In addition, shake information (acceleration information, the state of the image capturing apparatus), environment information (temperature, atmospheric pressure, illuminance, humidity, the amount of ultraviolet), and so forth may be used. The features are converted into values in a predetermined range, and the values are given as feature values to the neurons in the input layer. Thus, the number of neurons to be used in the input layer is equal to the number of feature values to be used.

In the determination based on the neural network, the output value is changed by changing the connection weights between neurons in learning processing, which will be described below, and a result of the determination can be adapted to a learning result.

A determination to perform automatic image capturing is changed by the activation condition read in S501 in FIG. 5. For example, activation by tap detection or activation by a specific audio command is highly likely to be a user operation requesting image capturing to be performed now. Thus, a setting is made to increase the frequency of image capturing.

In a case where a determination is made in S609 to capture an image in the automatic image capturing determination in S608, the processing proceeds to S610. In a case where the determination is not made, the automatic-image-capturing-mode processing ends, and the operation in FIG. 5 returns to S502.

In S610, image capturing starts. At this time, in the case of manual image capturing, still image capturing is performed or image capturing is performed using an image capturing method manually set by the user. In the case of automatic image capturing, image capturing starts at the timing determined in S608. At this time, auto-focus control is performed by the focus drive control circuit 204. In addition, exposure control for achieving appropriate brightness of a subject is performed by using an aperture control circuit, a sensor gain control circuit, and a shutter control circuit, which are not illustrated. Furthermore, after the image capturing, the image processing circuit 207 performs various image processing operations, such as auto white balance processing, noise reduction processing, and gamma correction processing, thereby generating an image.

When a predetermined condition is satisfied at the time of image capturing, the image capturing apparatus 101 may perform image capturing after notifying a person as a subject that image capturing will start. To notify the person, for example, a sound from the audio output circuit 216 or LED light from the LED control circuit 222 may be used, or a motion operation for visually guiding the line of sight of the subject by pan/tilt driving may be used. The predetermined condition may be, for example, the number of faces within an angle of view, a smile level or eye closure level of a face, a line-of-sight angle or face angle of a person as a subject, a face authentication ID number, the number of people who have been registered by personal authentication, or the like. The predetermined condition may be a general object recognition result at the time of image capturing, a scene determination result, an elapsed time from the last image capturing, an image capturing time, whether or not a current position based on GPS information is a scenic place, an audio level at the time of image capturing, presence/absence of a person producing a voice, whether or not there is clapping of hands or applause, or the like. Also, the predetermined condition may be shake information (acceleration information, the state of the image capturing apparatus), environment information (temperature, atmospheric pressure, illuminance, humidity, the amount of ultraviolet), or the like. As a result of performing image capturing after providing a notification based on these conditions, a favorable image in which a subject is looking into a camera can be taken in an important scene.

A plurality of predetermined conditions may be used, and a sound, a lighting method of the LED (the color, blink time, etc.), or a pan/tilt motion method (the manner of movement or driving speed) may be changed in accordance with each condition.

In S611, image editing, such as editing of the image generated in S610 or addition to a moving image, is performed. The image editing specifically includes trimming based on the face of a person or an in-focus position, rotation of the image, and addition of a high dynamic range (HDR) effect, a blur effect, a color conversion filter effect, or the like. A plurality of edited images may be generated from the image generated in S610 by combining the above-described processes, and may be stored separately from the image generated in S610. Regarding moving image processing, a captured moving image or still image may be added to a generated edited moving image while adding special effects, such as slide, zoom, and fade effects. The image editing method used in the image editing in S611 can be determined in accordance with a determination based on the neural network with use of information on a captured image or various pieces of information detected before image capturing. The determination condition of this determination process can be changed in accordance with learning processing, which will be described below.

In S612, learning data is generated from the captured image. Here, information to be used in learning processing, which will be described below, is generated and recorded. Specifically, the information includes a zoom magnification at the time of image capturing, a general object recognition result at the time of image capturing, a face detection result, the number of faces in the captured image, a smile level or eye closure level of a face, a face angle, a face authentication ID number, a line-of-sight angle of a person as a subject, and so forth in the image captured this time. In addition, the information includes a scene determination result, an elapsed time from the last image capturing, an image capturing time, GPS position information and the amount of change in position from the last image capturing, an audio level at the time of image capturing, whether there is a person producing a voice, clapping of hands, or applause, and so forth. In addition, the information includes shake information (acceleration information, the state of the image capturing apparatus), environment information temperature, atmospheric pressure, illuminance, humidity, the amount of ultraviolet), a moving image capturing time, whether or not the image is based on a manual image capturing instruction, and so forth. Furthermore, a score is calculated, which is an output of the neural network and indicates the user's preferences for the image.

The above-described information is generated and recorded as tag information in a captured image file. Alternatively, the information may be written into the nonvolatile memory 214, or may be stored in the recording medium 219 as so-called catalog data in the form of a list of information items of the captured image.

In S613, information on previous image capturing is updated. Specifically, among the number of captured images in each area described regarding S608, the number of captured images of each person who has been registered by personal authentication, the number of captured images of each subject recognized in general object recognition, and the number of captured images for each scene in scene determination, the number corresponding to the image captured this time is incremented by 1.

Learning-Mode Processing

Next, a description will be given of learning for meeting preferences of a user according to the present embodiment.

In the present embodiment, the learning processing circuit 217 performs learning for meeting the preferences of a user by using the neural network illustrated in FIG. 7 and a machine learning algorithm. As the learning processing circuit 217, for example, Jetson TX2 by NVIDIA Corporation is used. The neural network is used to predict an output value from an input value. By learning actual input values and output values in advance, an output value can be estimated based on a new input value. With use of the neural network, learning for meeting the preferences of a user is performed for the above-described automatic image capturing and subject search. In the present embodiment, the learning processing circuit 217 performs both machine learning and determination processing using a learning parameter obtained through the machine learning, but the present embodiment is not limited thereto. For example, an external apparatus may perform machine learning, and the learning processing circuit 217 may receive a learning parameter generated by the external apparatus and perform determination processing.

In addition, subject information serving as feature data to be input to the neural network (obtained from face recognition, general object recognition, or the like) is registered.

Learning for automatic image capturing according to the present embodiment will be described. In automatic image capturing, learning is performed to automatically capture an image that suits the preferences of a user. As described above using the flowchart in FIG. 6, learning data is generated after image capturing (S612). An image to be learned is selected in the method described below, and leaning is performed by changing the connection weights between neurons of the neural network, based on the learning data included in the image.

Next, a leaning method will be described. The learning method includes "learning within the image capturing apparatus" and "learning in cooperation with a communication apparatus". The method for learning within the image capturing apparatus will be described first.

The learning within the image capturing apparatus according to the present embodiment includes the following method.

(1) Learning with Detected Information at the Time of Image Capturing Instruction by User As described above regarding S607 to S613 in FIG. 6, the image capturing apparatus 101 according to the present embodiment is capable of performing two types of image capturing, manual image capturing and automatic image capturing. In a case where a manual image capturing instruction is provided (based on three determinations, as described above) in S607, information indicating that the image was manually captured is added to the captured image in S612. In a case where an image is captured after a determination is made that automatic image capturing is to be performed in S609, information indicating that the image was automatically captured is added to the captured image in S612. Also, information indicating that the image was manually captured is added to the image captured in the manual image capturing mode in S506.

In manual image capturing, it is highly possible that an image is captured with a subject, scene, place, and time interval that suit the preferences of the user Thus, learning is performed based on pieces of feature data obtained through manual image capturing and learning data of the image obtained through manual image capturing.

With use of detected information obtained through manual image capturing, learning is performed regarding extraction of feature values and registration of personal authentication, registration of expressions of individuals, and registration of a combination of people in the captured image. With use of detected information obtained through subject search, for example, learning is performed in which the importance level of a person or object near a subject registered as an individual is changed based on the expression of the subject.

Next, learning in cooperation with an external communication apparatus according to the present embodiment will be described. The learning in cooperation with an external communication apparatus according to the present embodiment includes the following methods.

(2) Learning by Obtaining Image by External Communication Apparatus

As described above with reference to FIG. 3, the image capturing apparatus 101 and the external apparatus 301 have the communication devices 302 and 303 as communication units. Transmission/reception of an image is performed mainly by the communication device 302, and the external apparatus 301 is capable of obtaining an image in the image capturing apparatus 101 through communication via a dedicated application in the external apparatus 301. In addition, thumbnail images of image data stored in the image capturing apparatus 101 can be viewed via a dedicated application in the external apparatus 301. Accordingly, a user is able to select a desired image from among the thumbnail images, check the image, and take the image into the external apparatus 301 by providing an image acquisition instruction.

At this time, the user selects the image, provides an instruction to transmit the image, and obtains the image. Thus, it is highly possible that the obtained image suits the preferences of the user. Thus, the obtained image is determined to be an image to be learned, learning data is generated from the obtained image in a manner similar to S612 in FIG. 6, and learning is performed based on the learning data. Accordingly, various kinds of learning for meeting the preferences of the user can be performed.

Figure 8:
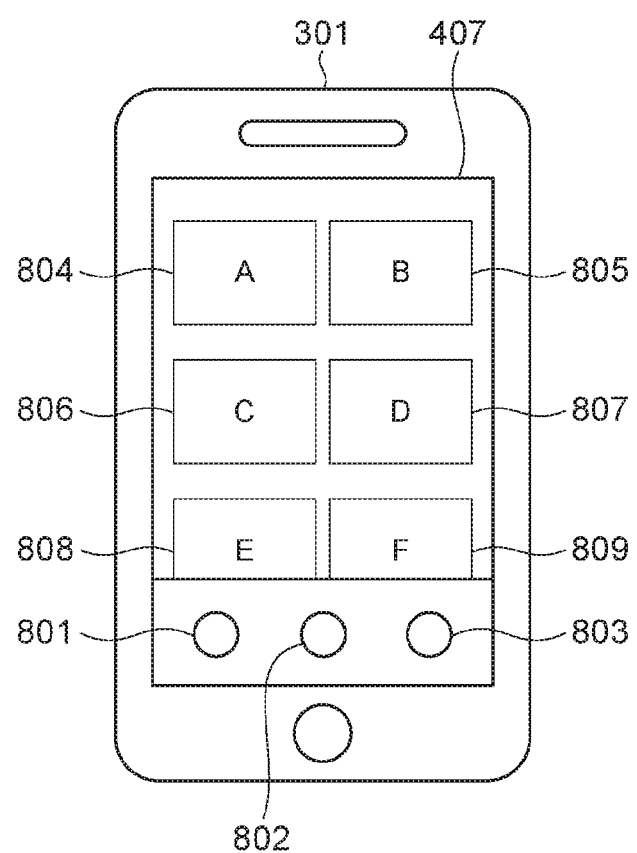
FIG. 8 is a diagram for describing image display processing.

An example operation will be described. FIG. 8 illustrates an example in which a user views images in the image capturing apparatus 101 via a dedicated application of the external apparatus 301, which is a smart apparatus. Thumbnail images 804 to 809 of image data stored in the image capturing apparatus 101 are displayed on the display device 407, and the user is able to select and obtain a desired image. In this case, display mode changing units 801 to 803 for changing a display mode are provided. Pressing of the display mode changing unit 801 causes the display mode to be changed to a date and time priority display mode, and the images in the image capturing apparatus 101 are displayed on the display device 407 in the order of image capturing date and time (for example, the image 804 is the latest and the image 809 is the oldest). Pressing of the display mode changing unit 802 causes the display mode to be changed to a recommended image priority display mode. Based on the scores indicating the preferences of the user for the individual images and calculated in S612 in FIG. 6, the images in the image capturing apparatus 101 are displayed on the display device 407 in descending order of score (for example, the image 804 has a high score and the image 809 has a low score). Pressing of the display mode changing unit 803 enables the user to designate a person or object as a subject. In addition, when a specific person or object as a subject is designated, only the specific subject can be displayed.

The setting of the display mode changing units 801 to 803 can be simultaneously turned ON. For example, in a case where the setting of all of them is in an ON state, images are displayed such that only a designated subject is displayed and that priority is given to the latest image and the high-score image.

In this way, the preferences of the user for captured images are learned, and thus it is possible to easily extract only images that suit the preferences of the user from among a large number of captured images with a simple checking operation.

(3) Learning by Inputting Determination Value to Image Via External Communication Apparatus As described above, the image capturing apparatus 101 and the external apparatus 301 have the communication units and are configured to enable the user to view the images stored in the image capturing apparatus 101 via the dedicated application in the external apparatus 301. Here, the user may assign a score to each image. The user may assign a high score (for example, 5) to an image that suits the preferences of the user and may assign a low score (for example, 1) to an image that does not suit the preferences of the user. Such a user operation allows the image capturing apparatus 101 to learn. The scores of the individual images are used for relearning in the image capturing apparatus 101, together with learning data. Learning is performed such that the output of the neural network based on the input, which is feature data obtained from designated image information, approaches the score designated by the user.

In the configuration of the present embodiment, the user inputs a determination value to a captured image via the external apparatus 301. Alternatively, the user may directly input a determination value to the image by operating the image capturing apparatus 101. In this case, for example, a touch screen display is provided on the image capturing apparatus 101, and the user presses a graphical user interface (GUI) button displayed on the touch screen display to set a mode for displaying captured images. Subsequently, the user inputs a determination value to each captured image while checking the image. Accordingly, learning can be performed in a similar manner.

(4) Learning by Changing Parameter by External Communication Apparatus

As described above, the image capturing apparatus 101 and the external apparatus 301 have the communication units, and thus a learning parameter that is currently set in the image capturing apparatus 101 can be transmitted to the external apparatus 301 and stored in the storage circuit 404 of the external apparatus 301. The learning parameter may be, for example, the connection weights between neurons of the neural network, a selection of a subject to be input to the neural network, and so forth. Also, a learning parameter set to a dedicated server may be obtained through the public line control circuit 406 via a dedicated application in the external apparatus 301, and the obtained learning parameter may be set as the leaning parameter in the image capturing apparatus 101. Accordingly, a parameter at a certain point of time may be stored in the external apparatus 301 and may be set to the image capturing apparatus 101, thereby resetting the learning parameter, or a learning parameter of another user may be obtained via a dedicated server and may be set to the own image capturing apparatus 101.

Next, a learning processing sequence will be described. In the mode setting determination in S504 in FIG. 5, a determination is made whether or not to perform learning processing. In the case of performing learning processing, a determination is made that the mode is the learning mode, and the learning-mode processing in S510 is performed.

The determination condition of the learning mode will be described. Whether or not to shift to the learning mode is determined based on an elapsed time from the last learning processing, the number of pieces of information usable for learning, whether a learning processing instruction has been provided via a communication device, or the like. The processing flow of determining whether or not to shift to the learning mode, which is performed in the mode setting determination in S504, is illustrated in FIG. 9.

Figure 9:
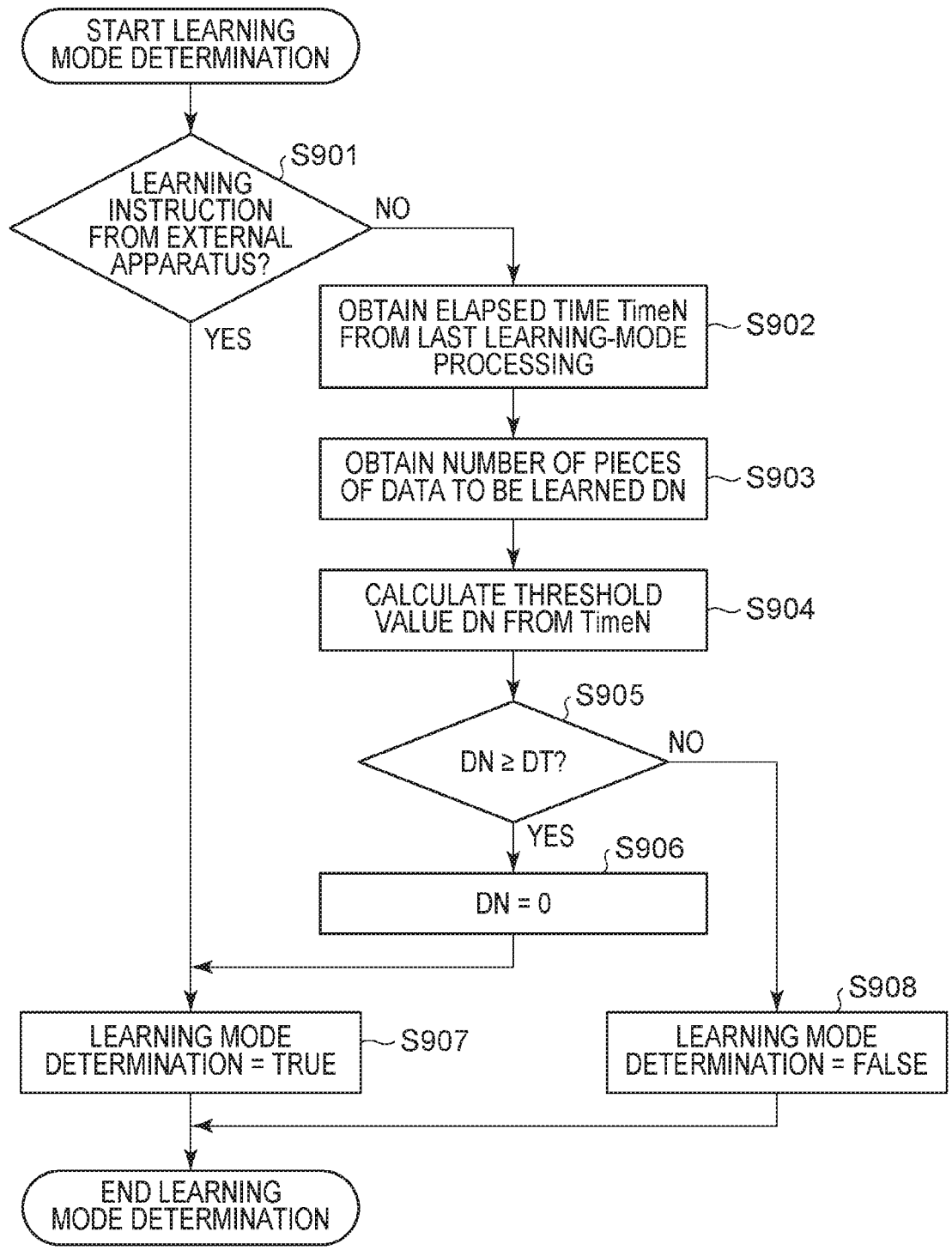
FIG. 9 is a flowchart for describing learning mode determination.

The processing illustrated in FIG. 9 starts in response to an instruction to start learning mode determination in the mode setting determination in S504. In S901, a determination is made whether or not there is a learning instruction provided from the external apparatus 301. The determination made here is a determination of whether there is an instruction to set a learning parameter, as in "learning by changing parameter by external communication apparatus". In a case where there is a learning instruction provided from the external apparatus 301 in S901, the processing proceeds to S907, where the learning mode determination is set to "TRUE" to perform the processing in S510, and the learning mode determination ends. In a case where there is no learning instruction provided from the external apparatus 301 in S901, the processing proceeds to S902.

In S902, an elapsed time TimeN from the last learning-mode processing is obtained, and then the processing proceeds to S903. In S903, the number of pieces of new data to be learned DN (the number of images designated to be learned during the elapsed time TimeN from the last learning processing) is obtained, and the processing proceeds to S904. In S904, a threshold value DT is calculated from TimeN. A table for obtaining the threshold value DT from TimeN may be prepared. For example, a threshold value DTa in a case where TimeN is smaller than a predetermined value is set to be larger than a threshold value DTb in a case where TimeN is larger than the predetermined value, and the threshold value is set to decrease with time. Accordingly, even in a case where there is a small number of pieces of learning data, relearning is performed when a long time elapses, so that the image capturing apparatus 101 can easily learn to change in accordance with a usage time. For a certain period after the learning-mode processing is performed, the threshold value DT may be set to 0 so that the mode does not shift to the learning mode.

After the threshold value DT is calculated in S904, the processing proceeds to S905, where a determination is made whether or not the number of pieces of data to be learned DN is larger than or equal to the threshold value DT. In a case where DN is larger than or equal to the threshold value DT, the processing proceeds to S906, where DN is set to 0. After that, the processing proceeds to S907, where the learning mode determination is set to "TRUE" to perform the processing in S510, and the learning mode determination ends.

In a case where DN is smaller than the threshold value DT in S905, the processing proceeds to S908. Because there is neither a registration instruction nor learning instruction from the external apparatus 301 and the number of pieces of learning data is smaller than a predetermined value, the learning mode determination is set to "FALSE" not to perform the processing in S510, and the learning mode determination ends.

Next, the details of the learning-mode processing (S510) will be described. The detailed flow of the learning-mode processing is illustrated in FIG. 10.

Figure 10:
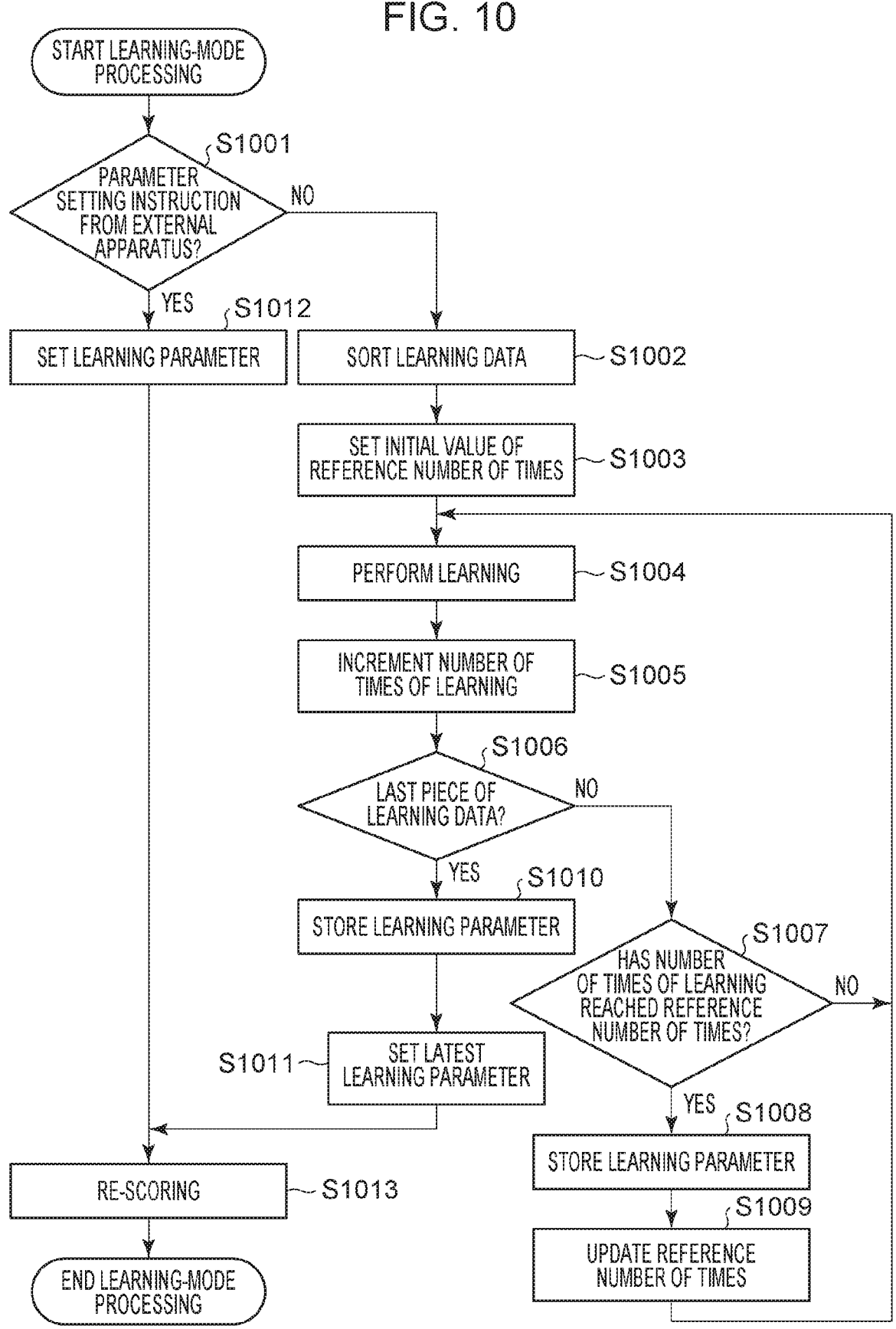
FIG. 10 is a flowchart for describing learning-mode processing.

The processing illustrated in FIG. 10 starts in S510 after the determination "learning mode" is made in S509 in FIG. 5. In S1001, a determination is made whether there is a learning parameter setting instruction provided from the external apparatus 301. In a case where there is a learning parameter setting instruction provided from the external apparatus 301, the processing proceeds to S1012, where a learning parameter transmitted from the external apparatus 301 is set to each determiner (for example, the connection weights between neurons of the neural network), and the processing proceeds to S1013.

In a case where there is no learning parameter setting instruction provided from the external apparatus 301 in S1001, the processing proceeds to S1002. In S1002, pieces of learning data that have been obtained are sorted in order from the oldest acquisition timing. The learning data includes learning data generated from a captured image having information indicating that the image was manually captured, learning data generated from an image obtained by an external communication apparatus, and learning data generated from a captured image to which a determination value has been input via an external communication apparatus. The pieces of learning data may be sorted in order in which the images have been captured, instead of in order in which the pieces of learning data have been acquired.

In S1003, an initial value of a reference number of times is set. The reference number of times indicates the number of times learning has been performed using learning data, and is a value that is set at the intervals of 250, that is, 250, 500, 750, 1000, and the like in the present embodiment. In S1003, 250 as the smallest value is set as the reference number of times.

In S1004, one piece of learning data is selected in accordance with the order in which the learning data is sorted in S1002, and machine learning is performed. The learning is performed by using error backpropagation, gradient descent, or the like, and the connection weights between neurons of the neural network are recalculated to change the parameter of each determiner. In a case where the user has assigned a score to the image from which learning data has been generated, learning is performed by taking the score into account.

In S1005, the number of times of learning is incremented. It is assumed that the initial value of the number of times of learning is set to 0 at the time of starting the learning-mode processing.

In S1006, a determination is made whether the piece of learning data used in the learning is the last one of the pieces of learning data sorted in S1002. In a case where the piece of learning data is not the last one, the processing proceeds to S1007.

In S1007, a determination is made whether the number of times of learning has reached the reference number of times. In a case where the number of times of learning has not reached the reference number of times, the processing returns to S1004. In a case where the number of times of learning has reached the reference number of times, the processing proceeds to S1008.

In S1008, the leaning parameter that is generated at the time when the number of times of learning reaches the reference number of times is stored in the nonvolatile memory 214 in association with the reference number of times. At each time when the number of times of learning reaches 250, 500, 750, and 1000, the learning parameter associated with the corresponding number of times of learning is stored.

In S1009, the reference number of times is updated to the next smallest value. In the present embodiment, the reference number of times is updated in the order of 500, 750, and 1000, and then the processing returns to S1004.

Returning to S1006, in a case where the piece of learning data used in the learning is the last one of the pieces learning data sorted in S1002, the processing proceeds to S1010.

In S1010, the leaning parameter generated when the leaning with the last piece of learning data has been performed is stored as the latest learning parameter in the nonvolatile memory 214 separately from the learning parameter associated with the number of times of learning in S1008. That is, in a case where the number of pieces of learning data is 900, the learning parameters associated with the reference numbers of times 250, 500, and 750 are stored in the nonvolatile memory 214 in S1008. Furthermore, the learning parameter generated by using 900 pieces of learning data is stored in the nonvolatile memory 214 in S1010.

In S1011, the latest learning parameter stored in S1010 is set to each determiner (for example, the connection weights between neurons of the neural network), and the processing proceeds to S1013.

In S1013, new scores are assigned to the images in the recording medium 219. In the configuration according to the present embodiment, scores are assigned to all the captured image stored in the recording medium 219 based on a new learning result, and automatic editing or automatic file deletion is performed in accordance with the assigned scores. Thus, after relearning or learning parameter setting by the external apparatus 301 has been performed, it is necessary to update the scores of captured images. Thus, in S1013, recalculation is performed to assign new scores to the captured images stored in the recording medium 219, and after the process ends, the learning-mode processing ends. The recalculation for assigning new scores may be performed in accordance with an instruction from the user.

In the present embodiment, a description has been given based on the configuration in which learning is performed within the image capturing apparatus 101. Alternatively, the external apparatus 301 may have a learning function, learning data may be transmitted to the external apparatus 301, and learning may be performed by only the external apparatus 301 to produce similar learning effects. In this case, as described above regarding "learning by changing parameter by external communication apparatus", learning may be performed by setting the parameter, such as the connection weights between neurons of the neural network learned by the external apparatus 301, to the image capturing apparatus 101 by communication.

Alternatively, both the image capturing apparatus 101 and the external apparatus 301 may have a learning function. For example, at the timing when the learning-mode processing S510 is performed in the image capturing apparatus 101, the leaning data held by the external apparatus 301 may be transmitted to the image capturing apparatus 101, and learning parameters may be merged to perform learning.

Figure 11:
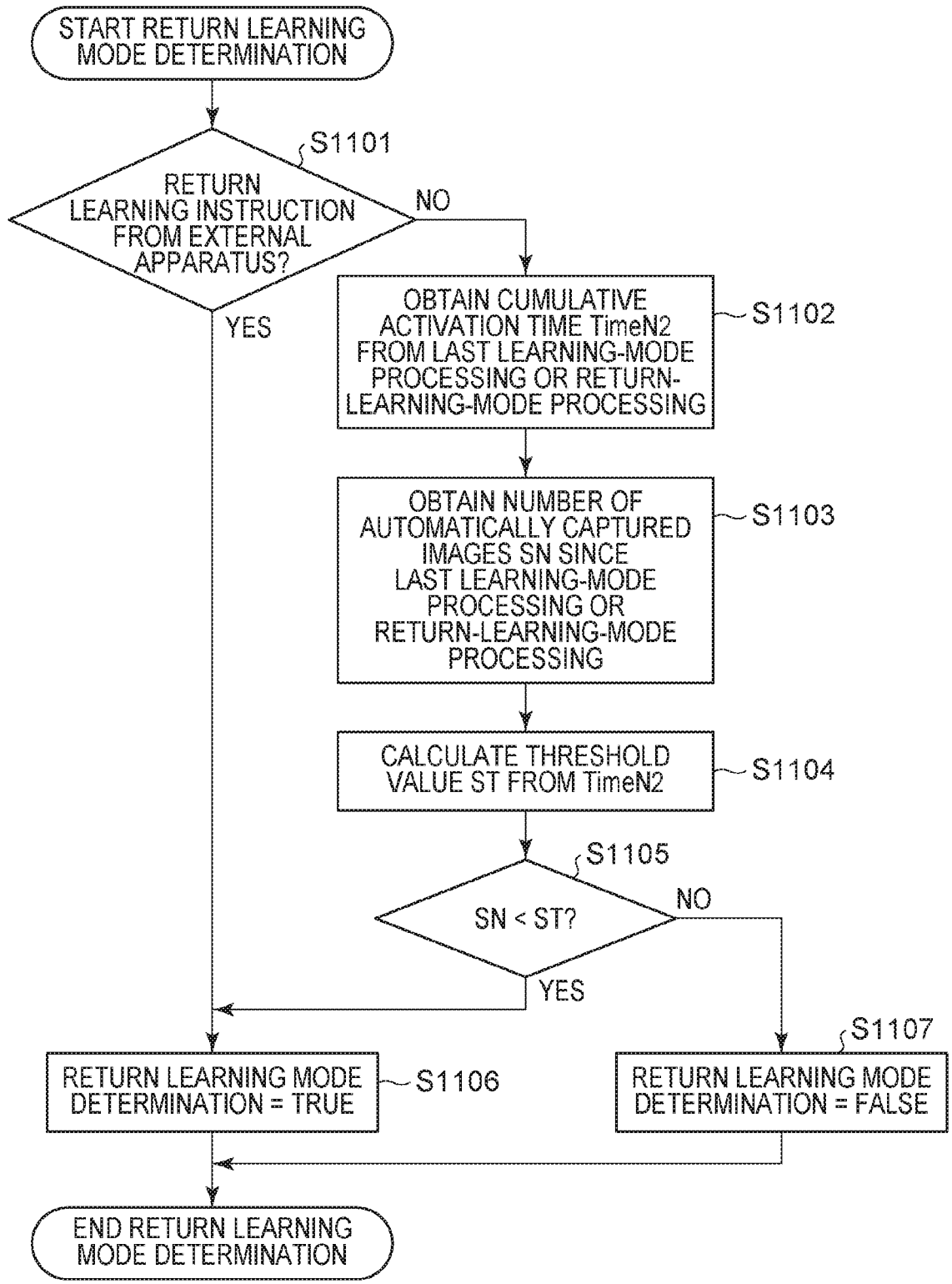
FIG. 11 is a flowchart for describing return learning mode determination.

Next, the determination condition of the return learning mode will be described. Whether or not to shift to the return learning mode is determined based on a cumulative activation time from the last learning-mode processing, the number of images automatically captured during the time, whether or not a return learning processing instruction has been provided via a communication apparatus, or the like. FIG. 11 illustrates a processing flow of determining whether or not to shift to the return learning mode, which is performed in the mode setting determination in S504.

The processing illustrated in FIG. 11 starts in response to an instruction to start return learning mode determination in the mode setting determination in S504. In S1101, a determination is made whether there is a return teaming instruction provided from the external apparatus 301. The determination made here is a determination of whether there is an instruction to set a previous learning parameter. In a case where there is an instruction to perform return learning provided from the external apparatus 301 in S1101, the processing proceeds to S1106, where the return earning mode determination is set to "TRUE" to perform the processing in S512, and the return learning mode determination ends. In a case where there is no instruction to perform return learning provided from the external apparatus 301 in S1101, the processing proceeds to S1102.

In S1102, a cumulative activation time TimeN2 from the last learning-mode processing or return-learning-mode processing is obtained, and the processing proceeds to S1103. In S1103, the number of automatically captured images SN since the last learning-mode processing or return-learning-mode processing is obtained, and the processing proceeds to S1104. In S1104, a threshold value ST is calculated from TimeN2. A table for obtaining the threshold value ST from TimeN2 may be prepared. For example, a threshold value STa in a case where TimeN2 is smaller than a predetermined value is set to be larger than a threshold value STb in a case where TimeN2 is larger than the predetermined value, and the threshold value is set to decrease with time. Accordingly, in a case where the number of captured images is small relative to the cumulative activation time, a determination is made that the learning parameter used at the time is not suitable for the user, and the learning parameter is changed to a previous learning parameter. For a certain period after the learning-mode processing or the return-learning-mode processing is performed, the threshold value ST may be set to 0 so that the mode does not shift to the return learning mode.

After the threshold value ST is calculated in S1104, the processing proceeds to S1105, and a determination is made whether or not the number of automatically captured images SN is smaller than the threshold value ST. In a case where SN is smaller than the threshold value ST, the processing proceeds to S1106, where the return learning mode determination is set to "TRUE" to perform the processing in S512, and the return learning mode determination ends. In a case where SN is larger than or equal to the threshold value ST in S1105, the processing proceeds to S1107, where the return learning mode determination is set to "FALSE", and the return learning mode determination ends.

The determination processing flow illustrated in FIG. 11 is an example, and another determination method may be used as long as it is possible to detect that automatic image capturing does not suit the preferences of the user. For example, a determination may be made to shift to the return learning mode in a case where the ratio of images whose score is lower than a predetermined score to images obtained through automatic image capturing and having scores input by the user is larger than or equal to a predetermined value. Alternatively, a determination may be made to shift to the return learning mode in a case where a score smaller than a predetermined value is input a predetermined number of times to an image obtained through automatic image capturing.

Next, the details of the return-learning-mode processing (S512) will be described. The detailed flow of the return-learning-mode processing is illustrated in FIG. 12.

Figure 12:
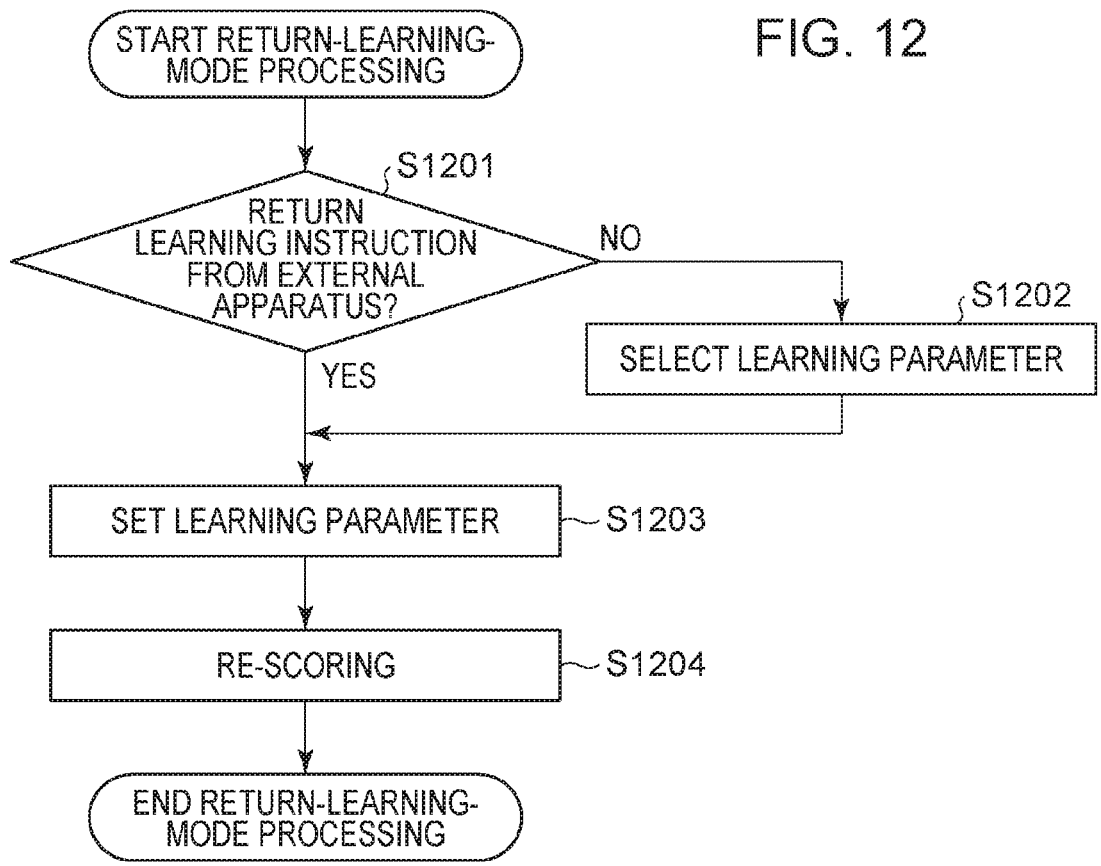
FIG. 12 is a flowchart for describing return-learning-mode processing.

The processing illustrated in FIG. 12 starts in S512 after the determination "return learning mode" is made in S511 in FIG. 5. In S1201, a determination is made whether there is a return learning instruction provided from the external apparatus 301.

Figure 13:
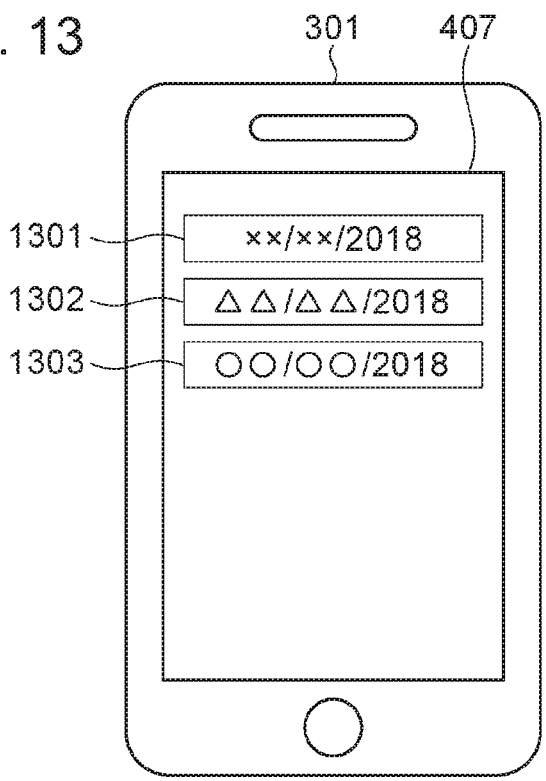
FIG. 13 is a diagram for describing learning data display processing.

A description will be given of an example operation of providing a return learning instruction using the external apparatus 301. FIG. 13 illustrates an example in which a plurality of learning parameters stored in the image capturing apparatus 101 are displayed via a dedicated application of the external apparatus 301, which is a smart apparatus. In FIG. 13, the display device 407 displays learning parameters 1301 to 1303 stored in the image capturing apparatus 101. The user is able to select any one of the learning parameters and set it to the image capturing apparatus 101. Here, the learning parameters associated with reference numbers of times may be distinguished from each other and selected. Alternatively, for user friendliness, the user may select only the date when a learning parameter is created, and then a learning parameter including the date and associated with the largest reference number of times may be automatically selected.

In a case where there is a return learning instruction provided from the external apparatus 301, the processing proceeds to S1203, where a learning parameter transmitted from the external apparatus 301 is set to each determiner (for example, the connection weights between neurons of the neural network). In a case where there is no return learning instruction provided from the external apparatus 301 in S1201, the processing proceeds to S1202, where a learning parameter is selected.

A method for selecting a learning parameter used in S1202 is, for example, a method based on a result of comparison between the number of automatically captured images SN obtained in S1103 in FIG. 11 and the threshold value ST calculated in S1104 in FIG. 11. For example, a value corresponding to a predetermined ratio, for example 80%, to the threshold value ST is regarded as a reference value. In a case where the number of automatically captured images SN is larger than or equal to the reference value, a determination can be made that many reliable pieces of learning data are included in the learning data that is used to obtain the learning parameter. Thus, any one of the learning parameters associated with the reference numbers of times stored in S1008 in FIG. 10 in the last learning-mode processing is selected to change the parameter of each determiner. Specifically, in a case where the processing proceeds to S1202 in FIG. 12 with the learning parameter obtained by using 900 pieces of learning data being set, the learning parameter associated with 750, which is the largest reference number of times, is selected. In a case where the processing proceeds to S1202 in FIG. 12 with the learning parameter associated with the reference number of times 750 being set, the learning parameter associated with 500, which is the next largest reference number of times, is selected.

On the other hand, in a case where the number of automatically captured images SN is smaller than the reference value, any of the learning parameters associated with the reference numbers of times obtained in the last learning-mode processing is not selected, but a learning parameter generated in the learning-mode processing preceding to the last learning-mode processing is set. This is because, in a case where the number of automatically captured images SN is smaller than the reference value, it is highly possible that the learning data used in the last leaning-mode processing includes a lot of noise having wrong scores. A possible reason is that an image manually captured by the user does not suit the preferences of the user, or the score assigned to an image by the user varies greatly from day to day. In such a case, even if a learning parameter associated with a different reference number of times among learning parameters obtained from the same learning data group is used, an increase in the number of automatically captured images is not expected. Thus, the learning data used in the last learning-mode processing is deleted from the nonvolatile memory 214. That is, in a case where the learning parameter associated with the reference number of times 750 is selected with the learning parameter obtained by using 900 pieces of learning data being set, the 751st to 900th pieces of learning data are deleted, and a newly generated 901st piece of learning data is used as a new 751st piece of learning data in machine learning.

In a case where the number of automatically captured images SN is larger than or equal to the reference value, if the return learning mode determination in S511 is "TRUE" in any of the learning parameters associated with all the reference numbers of times, a learning parameter generated in the further preceding learning-mode processing is used.

For simplicity, in a case where the return-learning-mode processing is started without determining the learning-mode processing whose learning data is used, the immediately preceding learning parameter may be used.

After the learning parameter to be used is selected, the processing proceeds to S1203, where the new learning parameter is set to each determiner, and the processing proceeds to S1204.

In S1204, new scores are assigned to the images in the recording medium 219, and then the return-learning-mode processing ends.

As described above, according to the present embodiment, in a case where a determination is made that the image capturing apparatus 101 has not obtained an image that is favorable for a user, image capturing is performed by using other learning data or a learning parameter corresponding to learning data in a different range. Accordingly, the frequency of obtaining an image that is favorable for the user can be increased.

Furthermore, as a result of preparing a plurality of learning parameters associated with different reference ranges of learning data, learning data can be effectively utilized without wasting the learning data as much as possible.

In a case where the image capturing apparatus 101 or a server with which the external apparatus 301 can communicate has a learning function, learning parameters associated with reference numbers of times may be stored in either the image capturing apparatus 101 or the server. In a case where the server has a learning function and stores learning parameters associated with reference numbers of times, the server transmits to the image capturing apparatus 101 a learning parameter selected in response to an instruction from the image capturing apparatus 101 or the external apparatus 301. Alternatively, the server may communicate with the image capturing apparatus 101 to determine the communication frequency of the image capturing apparatus 101, and thereby the server may select a learning parameter associated with any one of the reference numbers of times and transmit the selected learning parameter to the image capturing apparatus 101. Although machine learning is performed to automatically capture an image that suits the preferences of the user in the present embodiment, this is merely an example and the embodiment of the present disclosure is not limited thereto. An embodiment of the present disclosure can be applied to an inspection system that learns scratches and stains on surfaces of products by using machine learning, captures images of products that are transported, and determines whether the products are defective. Use of an embodiment of the present disclosure makes it possible to, in a case where learning about scratches and stains on surfaces of products is biased, perform inspection using other learning data or a learning parameter associated with learning data in a different range.

An embodiment of the present disclosure can be carried out by providing a program implementing one or more functions of the above-described embodiment to a system or apparatus via a network or storage medium and reading and executing the program with one or more processors in a computer of the system or apparatus. Also, an embodiment of the present disclosure can be carried out by a circuit implementing one or more functions (for example, an application specific integrated circuit (ASIC)).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-224125, filed Nov. 29, 2018, which is hereby incorporated by reference herein in its entirety.

What is claimed is:
1. An information processing apparatus comprising:
a control circuit configured to set or transmit a first learning parameter to a determining device that performs processing based on a learning parameter, wherein
the control circuit sets or transmits a second learning parameter instead of the first learning parameter to the determining device in a case where a result of a determination made by the determining device satisfies a predetermined condition,
the first learning parameter is a learning parameter that is obtained by performing machine learning using a first learning data group,
the second learning parameter is a learning parameter that is obtained by performing machine learning using a second learning data group, and
the first learning data group encompasses the second learning data group and includes learning data that is not included in the second learning data group.
2. The information processing apparatus according to claim 1,
wherein in a case where a plurality of pieces of learning data are arranged in order, the first learning data group includes a piece of learning data located after the second learning data group.
3. The information processing apparatus according to claim 2,
wherein the plurality of pieces of learning data are arranged in order in which the pieces of learning data have been obtained.
4. The information processing apparatus according to claim 2,
wherein each of the plurality of pieces of learning data is generated from a captured image, and the plurality of pieces of learning data are arranged in order in which images corresponding to the respective pieces of learning data have been captured.
5. The information processing apparatus according to claim 1,
wherein when learning is repeatedly performed a reference number of times among a plurality of reference numbers of times set in advance, the control circuit causes a learning parameter obtained through the learning to be stored in a memory in association with the reference number of times.
6. The information processing apparatus according to claim 5,
wherein the second learning parameter is a learning parameter associated with a largest reference number of times among reference numbers of times that are smaller than a number of times learning is repeatedly performed to obtain the first learning parameter.

7. The information processing apparatus according to claim 6,
wherein in a case where a result of a determination that is made by the determining device and that is based on a learning parameter associated with any one of the plurality of reference numbers of times satisfies the predetermined condition, the control circuit sets or transmits to the determining device a learning parameter associated with a next largest reference number of times.

8. The information processing apparatus according to claim 7,
wherein in a case where a result of a determination that is made by the determining device and that is based on any of learning parameters which are associated with the plurality of reference numbers of times and which are generated by repeating learning by selecting in order a plurality of pieces of learning data including the first learning data group satisfies the predetermined condition, the control circuit sets or transmits to the determining device a learning parameter generated in learning that is performed before learning using the plurality of pieces of learning data including the first learning data group.

9. The information processing apparatus according to claim 1,
wherein the control circuit causes the determining device to perform at least one of automatic image capturing and product inspection, based on the learning parameter.

10. The information processing apparatus according to claim 9,
wherein the predetermined condition is that a frequency of automatic image capturing based on the first learning parameter is lower than a threshold value.

11. The information processing apparatus according to claim 1,
wherein the determining device uses a neural network, and the learning parameter is a value for setting a connection weight between neurons of the neural network.

12. The information processing apparatus according to claim 1, further comprising the determining device.

13. An image capturing apparatus comprising:
an image capturing device;
a determining device configured to determine whether or not a condition for performing automatic image capturing based on a learning parameter is satisfied; and
a control circuit configured to set a first learning parameter to the determining device, wherein
the control circuit sets a second learning parameter instead of the first learning parameter to the determining device in a case where a result of the automatic image capturing satisfies a predetermined condition,
the first learning parameter is a learning parameter that is obtained by performing machine learning using a first learning data group,
the second learning parameter is a learning parameter that is obtained by performing machine learning using a second learning data group, and
the first learning data group encompasses the second learning data group and includes teaming data that is not included in the second learning data group.

14. A method for controlling an information processing apparatus, comprising:

setting or transmitting a first learning parameter to a determining device that performs processing based on a learning parameter; and
setting or transmitting a second learning parameter instead of the first learning parameter to the determining device in a case where a result of a determination made by the determining device satisfies a predetermined condition, wherein
the first learning parameter is a learning parameter that is obtained by performing machine learning using a first learning data group,
the second learning parameter is a learning parameter that is obtained by performing machine learning using a second learning data group, and
the first learning data group encompasses the second learning data group and includes learning data that is not included in the second learning data group.

15. A non-transitory storage medium for storing a program that can be executed by a processor,
wherein, when executed by the processor, the program causes the processor to execute an image processing method comprising:
setting or transmitting a first learning parameter to a determining device that performs processing based on a learning parameter; and
setting or transmitting a second learning parameter instead of the first learning parameter to the determining device in a case where a result of a determination made by the determining device satisfies a predetermined condition, wherein
the first learning parameter is a learning parameter that is obtained by performing machine learning using a first learning data group,
the second learning parameter is a learning parameter that is obtained by performing machine learning using a second learning data group, and
the first learning data group encompasses the second learning data group and includes learning data that is not included in the second learning data group.

16. An information processing apparatus comprising:
a control circuit configured to set or transmit a first learning parameter to a learning processing circuit that performs processing based on a learning parameter, wherein
the control circuit sets or transmits a second learning parameter instead of the first learning parameter to the learning processing circuit in a case where a result of a determination made by the learning processing circuit satisfies a predetermined condition,
the first learning parameter is a learning parameter that is obtained by performing machine learning using a first learning data group,
the second learning parameter is a learning parameter that is obtained by performing machine learning using a second learning data group, and
the first learning data group encompasses the second learning data group and includes learning data that is not included in the second learning data group.

17. The information processing apparatus according to claim 16,
wherein in a case where a plurality of pieces of learning data are arranged in order, the first learning data group includes a piece of learning data located after the second learning data group.

18. The information processing apparatus according to claim 17, wherein the plurality of pieces of learning data are arranged in order in which the pieces of learning data have been obtained.

19. The information processing apparatus according to claim 16,
wherein the control circuit causes the determining device to perform at least one of automatic image capturing and product inspection, based on the learning parameter.

20. The information processing apparatus according to claim 19,
wherein the predetermined condition is that a frequency of automatic image capturing based on the first learning parameter is lower than a threshold value.

* * * * *